(12) United States Patent
Joyce

(10) Patent No.: US 11,144,271 B1
(45) Date of Patent: Oct. 12, 2021

(54) SYSTEMS FOR MOVEABLE COMPUTER DISPLAY DEVICES

(71) Applicant: SCREEN IT UP CORP., Charleston, WV (US)

(72) Inventor: Deborah Joyce, Charleston, WV (US)

(*) Notice: Subject to any disclaimer, the term of this patent is extended or adjusted under 35 U.S.C. 154(b) by 100 days.

(21) Appl. No.: 16/699,767

(22) Filed: Dec. 2, 2019

Related U.S. Application Data

(60) Provisional application No. 62/777,078, filed on Dec. 8, 2018.

(51) Int. Cl.
*G06F 3/14* (2006.01)
*G06F 3/044* (2006.01)
*G06F 3/01* (2006.01)

(52) U.S. Cl.
CPC ............ *G06F 3/1446* (2013.01); *G06F 3/016* (2013.01); *G06F 3/044* (2013.01)

(58) Field of Classification Search
CPC ......... G06F 3/1446; G06F 3/016; G06F 3/044
See application file for complete search history.

(56) References Cited

U.S. PATENT DOCUMENTS

| | | | |
|---|---|---|---|
| 6,016,171 A | 1/2000 | Tsao | |
| 6,076,786 A | 6/2000 | Meyer | |
| 6,326,955 B1 | 12/2001 | Ditzik | |
| 6,816,365 B2 | 11/2004 | Hill et al. | |
| 7,561,414 B2 | 7/2009 | Li et al. | |
| 7,724,511 B2 | 5/2010 | Jacobs | |
| 8,390,997 B1* | 3/2013 | Dominy | G06F 1/1637 361/679.27 |
| 2003/0038567 A1* | 2/2003 | Doan | G06F 1/1656 312/223.2 |
| 2003/0103324 A1 | 6/2003 | Gallivan | |
| 2004/0228077 A1 | 11/2004 | Hall et al. | |
| 2008/0094792 A1* | 4/2008 | Chen | G06F 1/1683 361/679.06 |
| 2008/0253094 A1* | 10/2008 | Doczy | E05B 17/0037 361/726 |

(Continued)

FOREIGN PATENT DOCUMENTS

| | | |
|---|---|---|
| BR | PI0901660 A2 | 1/2011 |
| CN | 2812080 Y | 8/2006 |

(Continued)

OTHER PUBLICATIONS

Liszewski "Flybook VM Laptop With Adjustable Height Screen", http://www.ohgizmo.com/2006/12/06/flybook-vm-laptop-with-adjustable-height-screen/ (2006).

(Continued)

*Primary Examiner* — Stacy Khoo
(74) *Attorney, Agent, or Firm* — Dinsmore & Shohl LLP; Monika L'Orsa Jaensson

(57) ABSTRACT

Systems for moveable computer display devices are provided. A computer display system includes a base member that provides stability and includes an input device. The system further includes a support member attached to a first terminus of the base member. As part of the system, the support member includes an actuator to change support member length based upon an input received at the input device. The system also includes a display device attached at a second terminus of the support member opposite the first terminus.

6 Claims, 22 Drawing Sheets

(56) References Cited

U.S. PATENT DOCUMENTS

2019/0093402 A1* 3/2019 Cheah ................... G06F 1/1677
2019/0227598 A1* 7/2019 Miele .................... G06F 1/1679

FOREIGN PATENT DOCUMENTS

| | | | |
|---|---|---|---|
| CN | 2884290 | Y | 3/2007 |
| CN | 2906716 | Y | 5/2007 |
| CN | 100474211 | C | 4/2009 |
| CN | 203054683 | U | 7/2013 |
| EP | 1093605 | B1 | 8/2004 |
| GB | 2358259 | A | 7/2001 |
| JP | 3132538 | U6 | 9/2008 |
| JP | 4350740 | B2 | 10/2009 |
| KR | 20060093830 | A | 8/2006 |
| KR | 20080092202 | A | 10/2008 |
| TW | 201807530 | A | 3/2018 |
| TW | M429903 | U * | 5/2021 |
| WO | 2007006190 | A1 | 1/2007 |
| WO | 2014023199 | A1 | 2/2014 |

OTHER PUBLICATIONS

Ramirez "ECS "Smart Neck" Laptop Comes with Swiveling Screen", https://gizmodo.com/ecs-smart-neck-laptop-comes-with-swiveling-screen-243815 (2007).

* cited by examiner

SYSTEMS FOR MOVEABLE COMPUTER DISPLAY DEVICES

CROSS-REFERENCE TO RELATED APPLICATIONS

This application claims the benefit of U.S. Provisional Application 62/526,834, filed Dec. 8, 2018, which is incorporated by reference in its entirety.

TECHNICAL FIELD

The present application generally relates to computing display systems.

BACKGROUND

Viewing a screen, such as a laptop screen, typically involves bending the head and neck in a forward position so the user can look downward at the screen. People may spend a considerable amount of time in this inefficient position, leading to aches and pains in the neck, back, and shoulders areas. The strain on the upper body can lead to pinched nerves, stiff necks, poor posture, and more. People may have a difficult time viewing a laptop screen at eye level to eliminate these issues.

Accordingly, a need exists for systems that provide users with additional viewing options.

SUMMARY

In one embodiment, a computer display system may include a base member configured to provide stability and comprising an input device. The computer display system may also include a support member attached to a first terminus of the base member. The support member may include an actuator configured to change support member length based upon an input received at the input device. The computer display system may further include a display device attached at a second terminus of the support member opposite the first terminus.

In another embodiment, a computer display system may include a base member configured to lay on a horizontal surface and provide stability. The computer display system may also include a first set of arms each hingedly connected at a first terminus to the base member. The computer display system may further include a second set of arms each respectively having a first terminus articulably connected to a second terminus of one of the first set of arms. The computer display system may additionally include a display device articulably connected to a second terminus of each of the second set of arms. The respective arms of the first and second sets of arms may be configured to reside on opposite sides of the display device based upon the arms being parallel to the frame and the display device laying horizontally upon the base member.

In yet another embodiment, a computer display system may include a base member configured to lay on a horizontal surface and provide stability. The computer display system may also include a first display device hingedly connected on a first side to the base member. The computer display system may also include a second display device hingedly connected to a second side of the first display device. The first and second sides may be on opposite sides of the first display device. The first display device may be configured to lay flat upon the base member. The second display device may also be further configured to lay flat upon the first display device such that the first display device is sandwiched between the base member and the second display device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to computer display systems that can be adjusted. A computer display system may include a screen whose position the user wants to adjust. For example, the user may press an input button to raise and lower the screen as desired. Alternatively, the user may manually raise/lower the screen. Both the automatic and manual computer display systems can be portable while also providing ease of use in establishing a good viewing height/angle. The range of movement of the computer display system may be used to prevent conditions such as "tech neck" and may work with a variety of body types and/or torso heights, which may have further benefits under anthropometrics. In another embodiment, a presenter may flip one of two screens so that one screen faces the presenter and the other screen faces the audience. This can allow the presenter to more seamlessly give a presentation on a second screen while facing both the first screen and the audience at the same time.

Figure 1A:
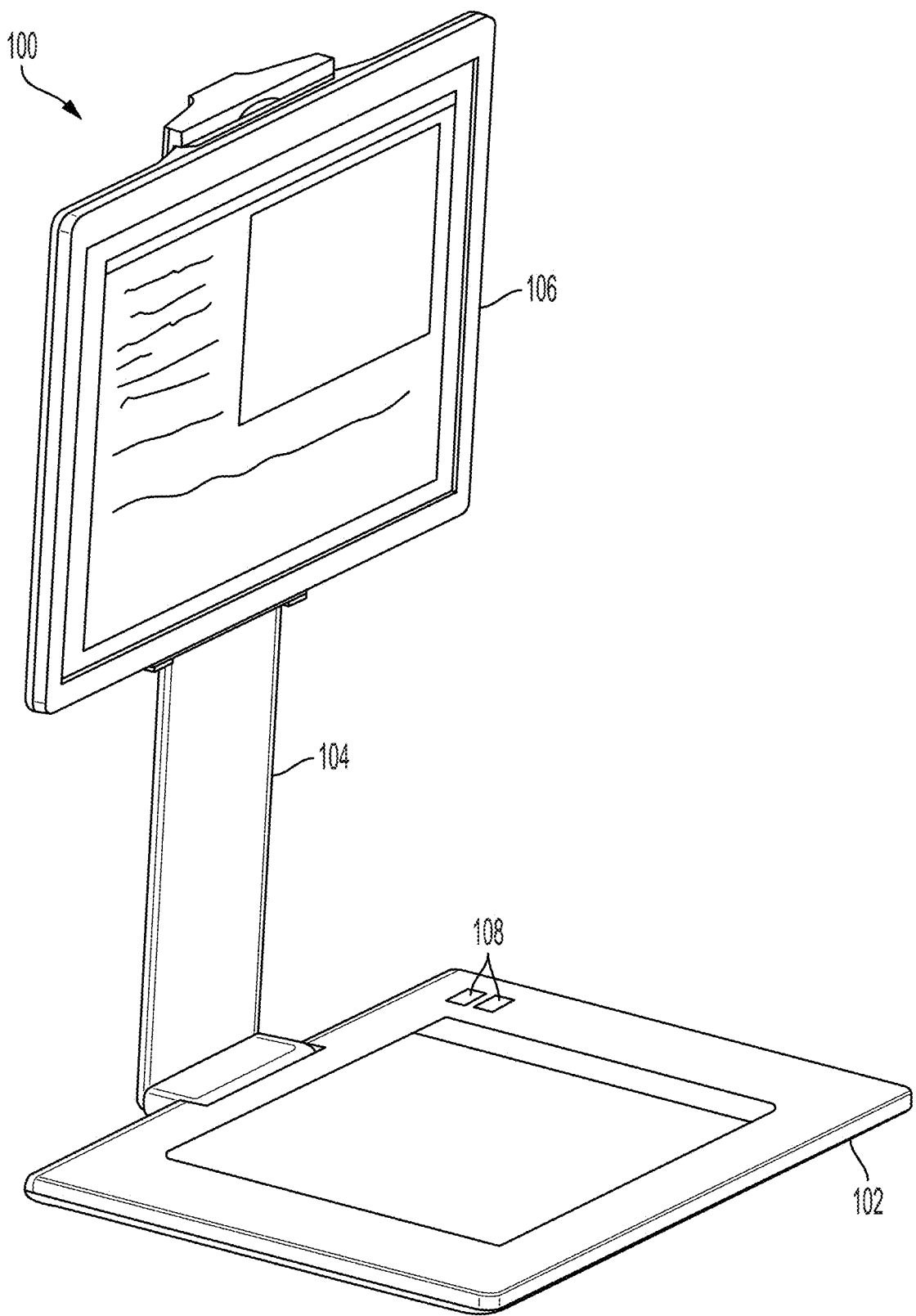
FIG. 1A schematically illustrates a frontal view of an automatic computer display system in a raised position, according to one or more embodiments shown and described herein.

Referring now to FIG. 1A, a frontal view of an automatic computer display system 100 in a raised position is depicted, through which embodiments of the disclosure can be implemented. The automatic computer display system 100 may include a base member 102, which by way of non-limiting example may be a laptop chassis or any other suitable portion of a computing device. The base member 102 may provide stability on any suitable surface, which may be completely or substantially horizontal, such as a table, desk, counter-top, floor, etc. A support member 104 may connect the base member 102 to a display device 106. In embodiments, the support member 104 may connect the display device 106 to base member 102 such as, by way of non-limiting examples, a laptop chassis, a keyboard or other input device, or to a laptop adapter. In various embodiments, there may be a cable plugin and/or a laptop accessory to integrate the support member 104 with various components of the automatic computer display system 100, such as the base member 102 and/or the display device 106.

The support member 104 may be electric (plug-in, battery powered, etc.) and/or motorized. The support member 104 may move the display device 106 in any suitable manner with respect to a user facing the display device 106, such as vertically parallel movement, purely vertical movement, horizontal movement, forward/backward movements, and the like. In some embodiments, the length of the support member 104 may be altered based upon an input received wirelessly, wherein the input specifies a range of movement or a predefined position with respect to the display device 106. For example, a smartphone app may be utilized to receive user input to specify a movement (which may include a range of movement) of the display device 106.

The automatic computer display system 100 may include a display device 106 which may be, by way of non-limiting example, a liquid crystal display, a light-emitting diode display, a cathode ray tube display, a plasma display, a digital light processing display, an organic light-emitting diode display, holographic display, three dimensional display, an electronic paper display, an electroluminescent display, or any other suitable type of display. The display device 106 may be configured for axial movement, such that the computer display system further comprises a joint, a ball, a hinge comprising one or more bars, a gearing, a ratchet, a belt, or a chain. The display device 106 may be configured to lock into a position utilizing a latch, a button, a knob, and/or any other suitable mechanism by which a user can grab the display device 106.

The display device 106 may tilt horizontally, tilt vertically, and/or tilt in three dimensions, which in some embodiments may be based upon being attached to one or more spherical rolling joints. In some embodiments, a cable connection and/or wireless connection from any suitable portion of the automatic computer display system 100 to a computing device may be utilized, which may also apply in regards to the dual screen computer display system 300 and/or any of the manual embodiments (manual lift computer display system 400, etc.) discussed below in more detail. In any embodiments described herein (including the dual screen computer display system and various embodiments of the manual lift computer display system, described below), any number of components (base members, display devices, support members, input devices, telescoping support members, arms, actuators, handles, tabs, grippers, connectors, and the like) may be utilized, any of which may be made of any suitable material (metal, plastic, wood, fiber, etc.).

The automatic computer display system 100 may include an input device 108, which may be or include, by way of non-limiting example, a button, a flip switch, a rocker switch, a potentiometer, a joystick, a trackpad, a pointing stick, a nub, or any type of object capable of receiving input from a user. Any suitable number of input devices 108 may be utilized, including different types of input devices 108 in the same automatic computer display system 100. Although depicted on the base member 102, any input device 108 may be part of any component of the automatic computer display system 100, may be its own separate component in the automatic computer display system 100, or may be external with respect to the automatic computer display system 100.

Figure 1B:
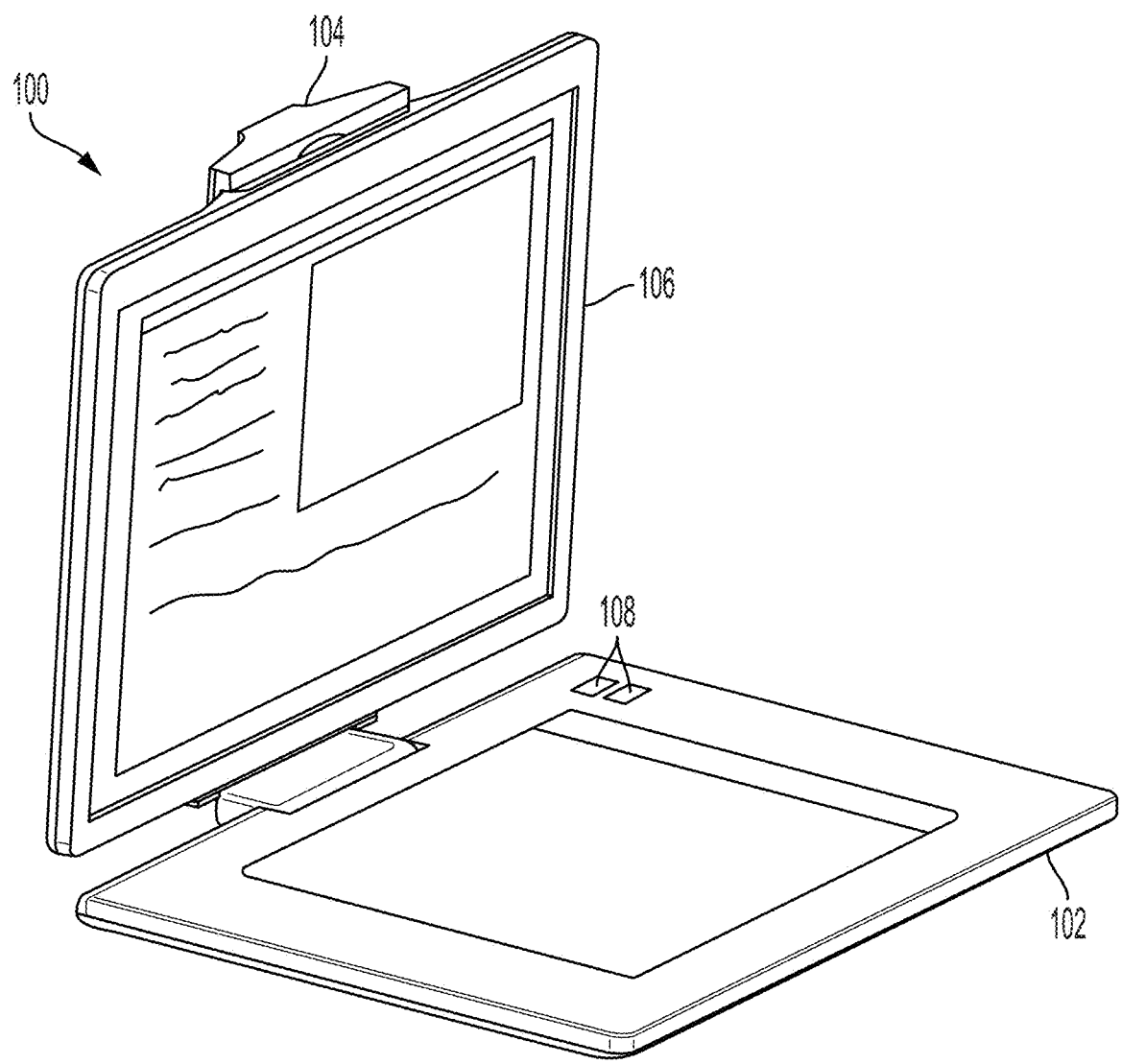
FIG. 1B schematically illustrates a frontal view of an automatic computer display system in a lowered position, according to one or more embodiments shown and described herein.

Turning now to FIG. 1B, a frontal view of an automatic computer display system 100 in a lowered position is depicted, through which embodiments of the disclosure can be implemented. The lowered position may be a full retraction of the support member 104, such that the display device 106 may be lowered onto the base member 102, which in some embodiments may resemble a laptop. In other embodiments, the support member 104 may only lower to a certain point or by a certain amount with a threshold amount of space remaining between the base member 102 and the display device 106. Any suitable amount of extension and/or movement may be utilized. In some embodiments, utilizing the input device 108 may cause a preset action, such as the display device 106 being lowered or raised by a predetermined amount.

Figure 1C:
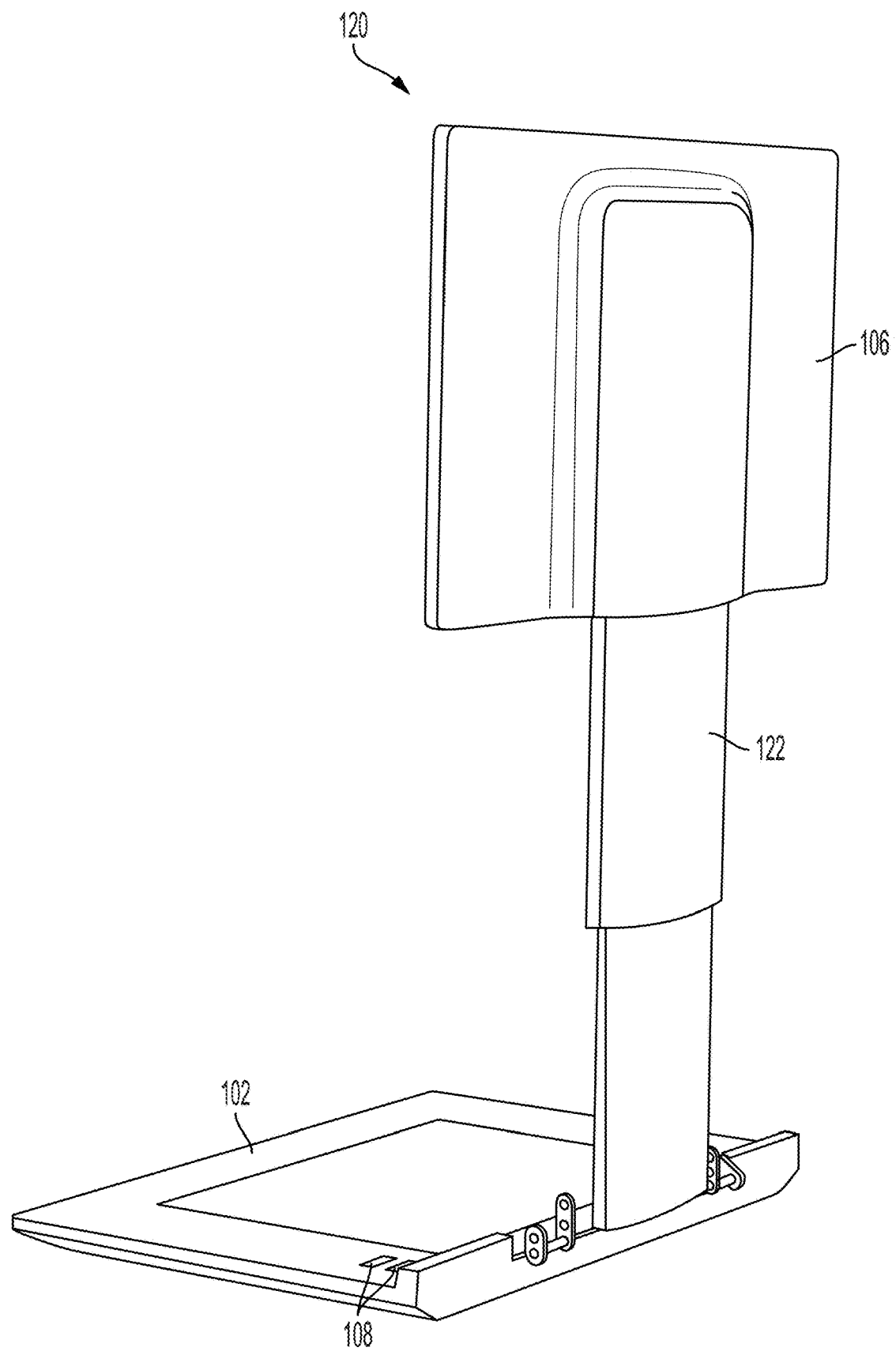
FIG. 1C schematically illustrates a rear view of an automatic telescoping computer display system in a raised position, according to one or more embodiments shown and described herein.

Turning now to FIG. 1C, a rear view of an automatic telescoping computer display system 120 in a raised position is depicted, through which embodiments of the disclosure can be implemented. In this embodiment, the upper telescoping support member 122 and the lower telescoping support member 124 telescope together to adjust the height of the display 106. In some embodiments, upper telescoping support member 122 may move before involving movement of the lower telescoping support member 124, or vice versa. In other embodiments, any number of support members may be utilized. Other embodiments may adjust a support member in other ways, such as utilizing various types of actuators, as discussed further below.

Figure 1D:
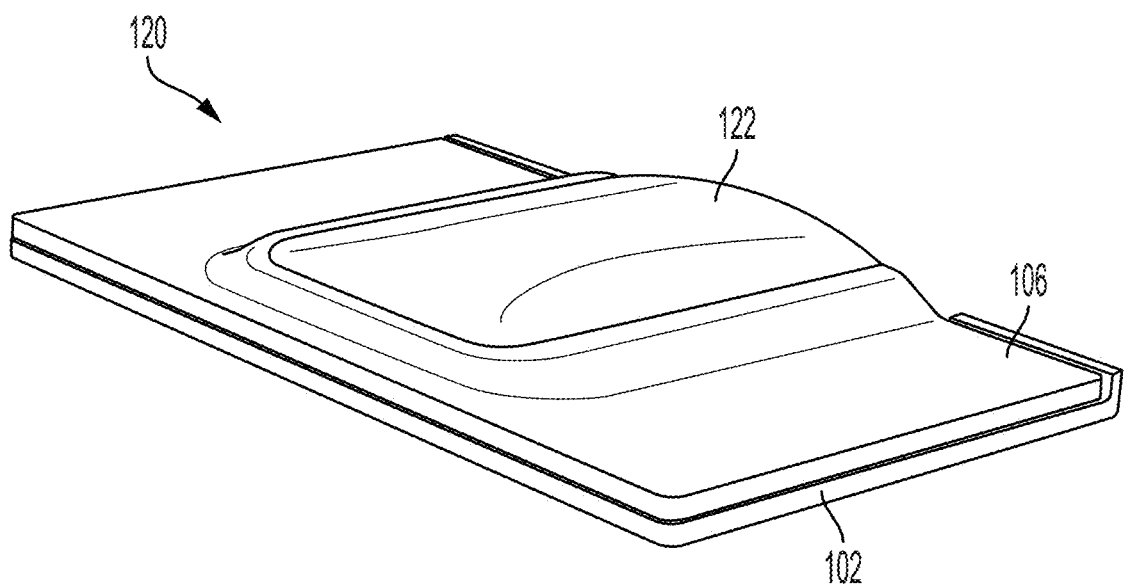
FIG. 1D schematically illustrates an automatic telescoping computer display system in a closed position, according to one or more embodiments shown and described herein.

Turning now to FIG. 1D, an automatic telescoping computer display system 120 in a closed position is depicted, through which embodiments of the disclosure can be implemented. In this embodiment, the display device 106 folds down onto the base member 102 with the upper telescoping support member 122 residing at least partially within the display device 106 and/or the base member 102. Although the display device 106 is hingedly connected to the base member 102 in this embodiment, any suitable type of connection may be utilized.

Figure 1E:
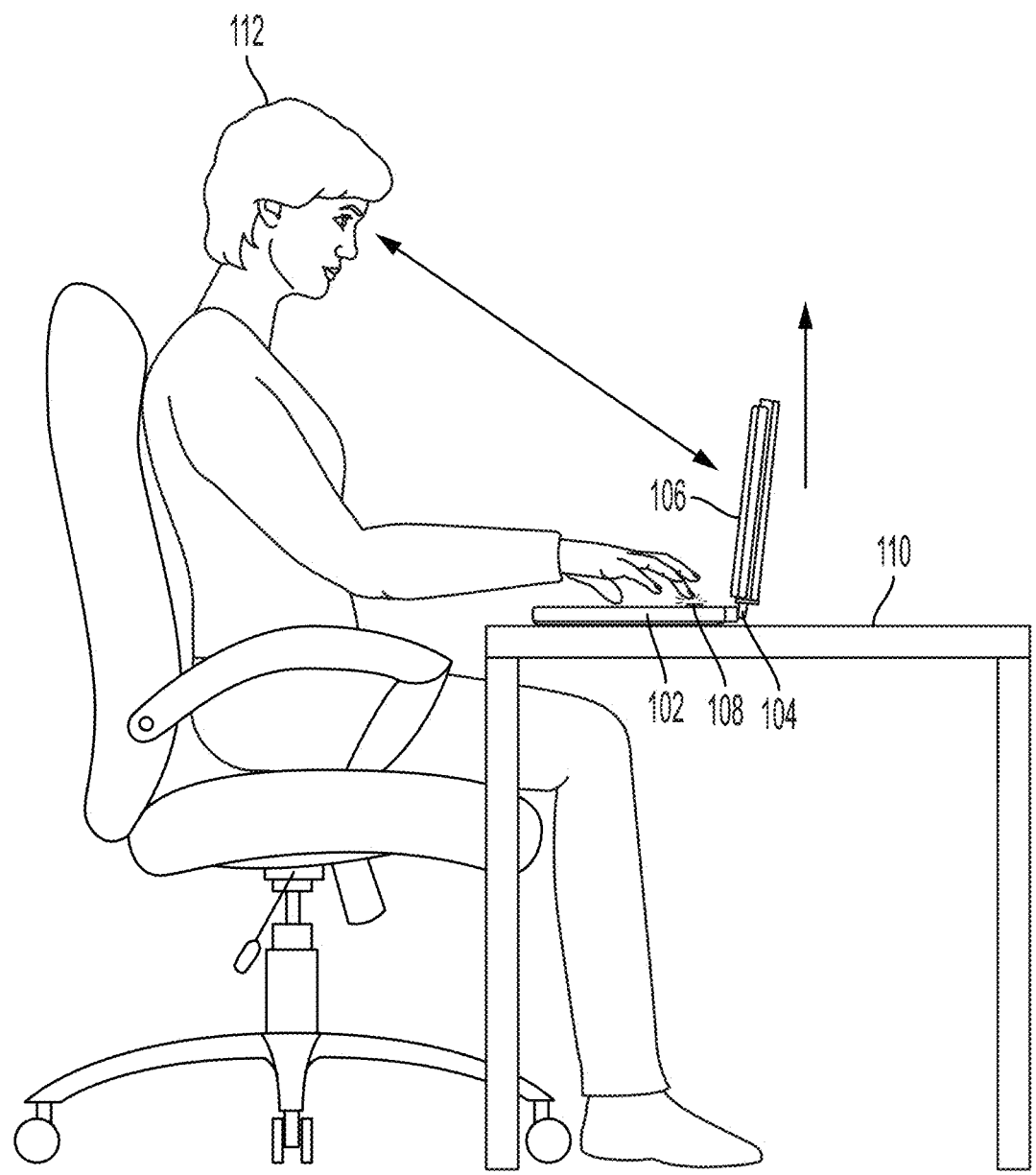
FIG. 1E schematically illustrates a user sitting at an automatic computer display system in a lowered position, according to one or more embodiments shown and described herein.

Turning now to FIG. 1E, a user 112 sitting at a desk that serves a surface 110 for an automatic computer display system 100 in a lowered position is depicted, through which embodiments of the disclosure can be implemented. In this non-limiting example, the user 112 looks downward toward the display device 106 while pressing an input device 108 to raise the screen.

Figure 1F:
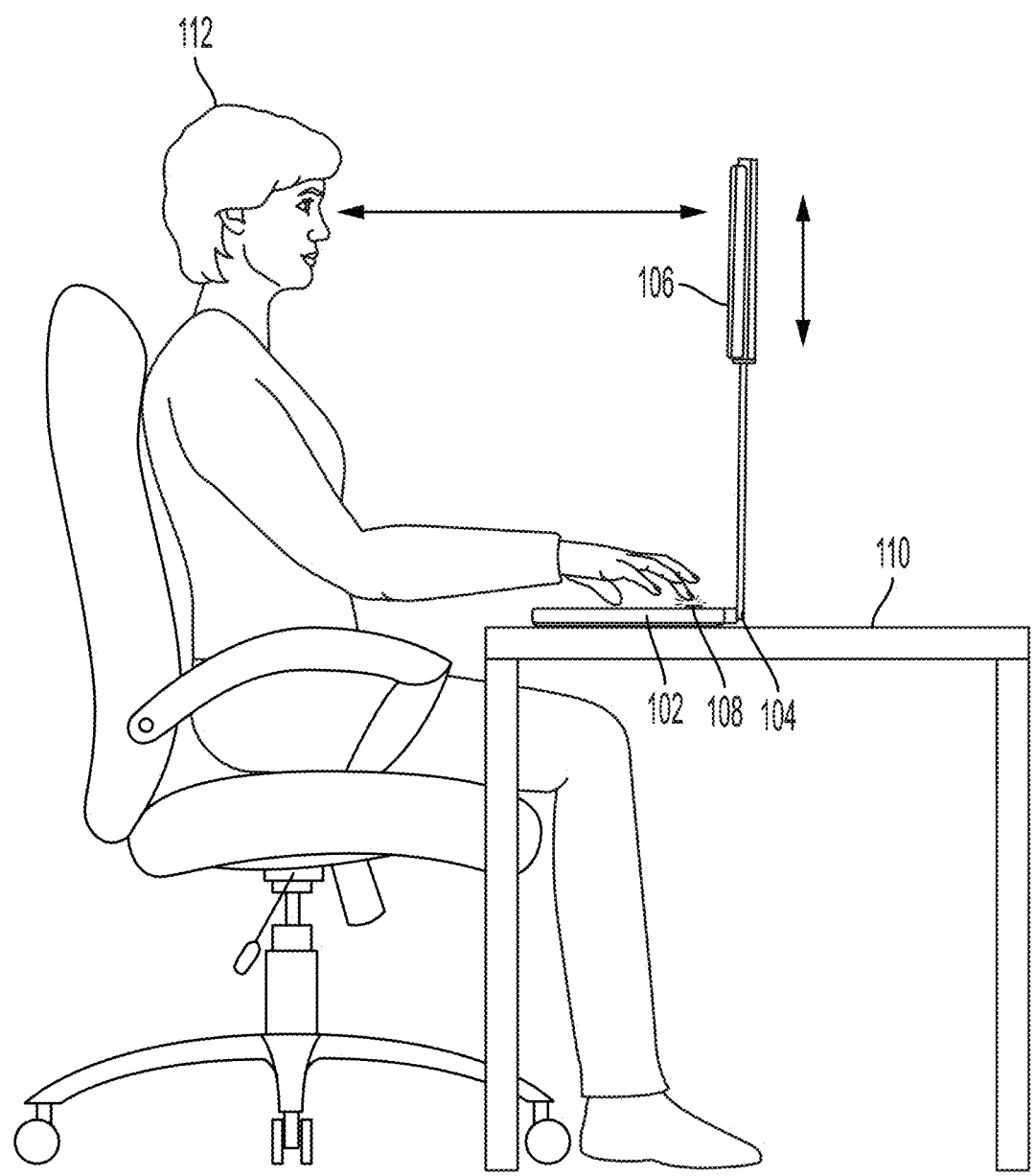
FIG. 1F schematically illustrates a user sitting at an automatic computer display system in a raised position, according to one or more embodiments shown and described herein.

Turning now to FIG. 1F, a user 112 sitting at a desk that serves a surface 110 for an automatic computer display system 100 in a raised position is depicted, through which embodiments of the disclosure can be implemented. In this non-limiting example, the user 112 looks straight ahead toward the display device 106 now at eye level, while releasing their finger from the input device 108.

Figure 2A:
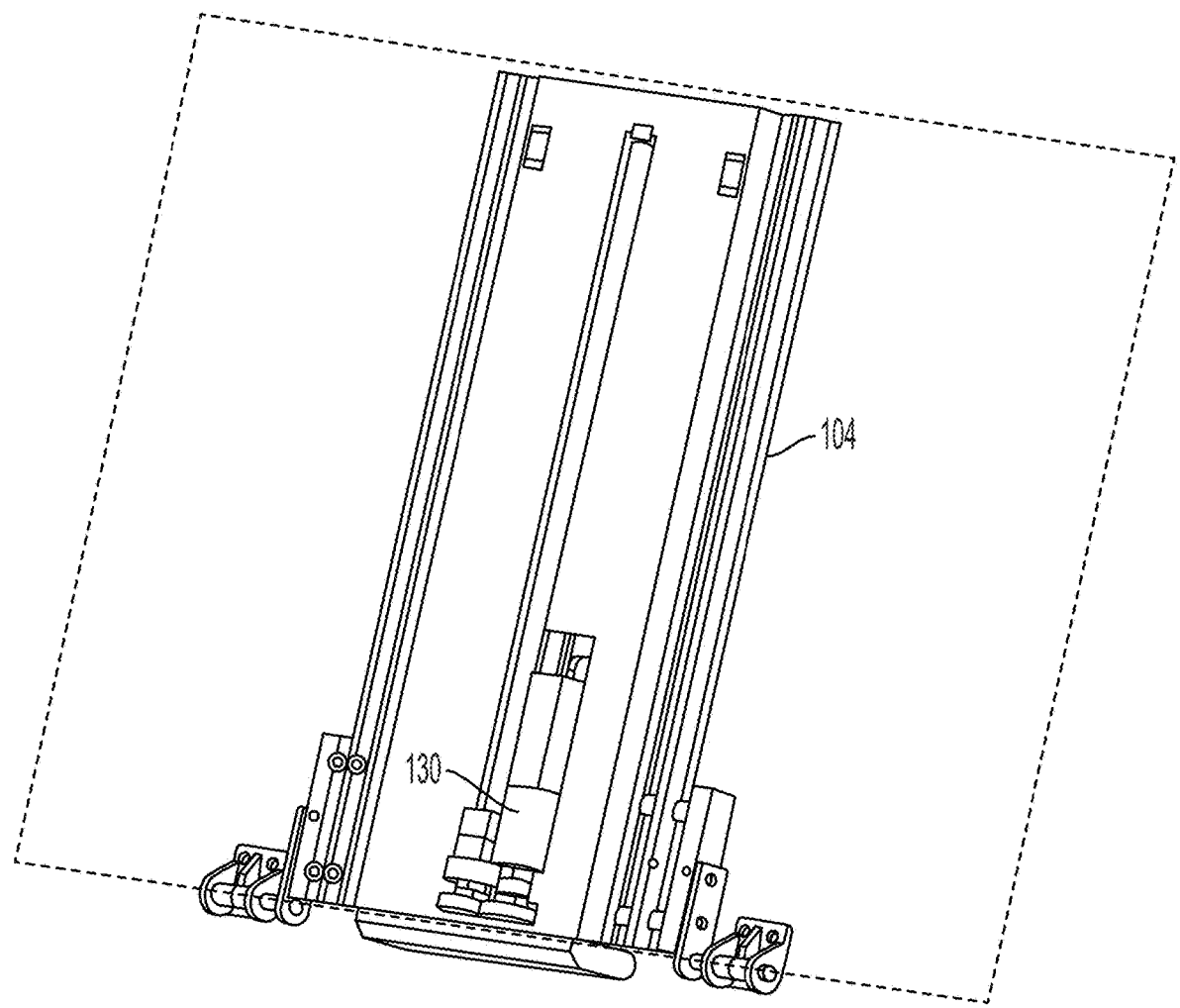
FIG. 2A schematically illustrates a support member utilizing an actuator within an automatic computer display system, according to one or more embodiments shown and described herein.

Turning now to FIG. 2A, a support member 104 utilizing an actuator 130 is depicted, through which embodiments of the disclosure can be implemented. An actuator 130 may include, by way of non-limiting example, a linear actuator, a precision actuator, a stepper motor, a direct current motor, a rodless actuator, a pneumatic actuator, an electromagnetic rail actuator, a rack and pinion actuator, a pulley actuator, a micro-positioning linear actuator, a nano-positioning linear actuator, a segmented spindle actuator, or any other suitable type of actuator. One or more actuators 130 may be utilized, where multiple types of actuators may be utilized within the same support member 104. The actuator 130 may be utilized to move the support member 104 in a vertically telescopic manner, as discussed herein in more detail in FIGS. 2B-2C.

Figure 2B:
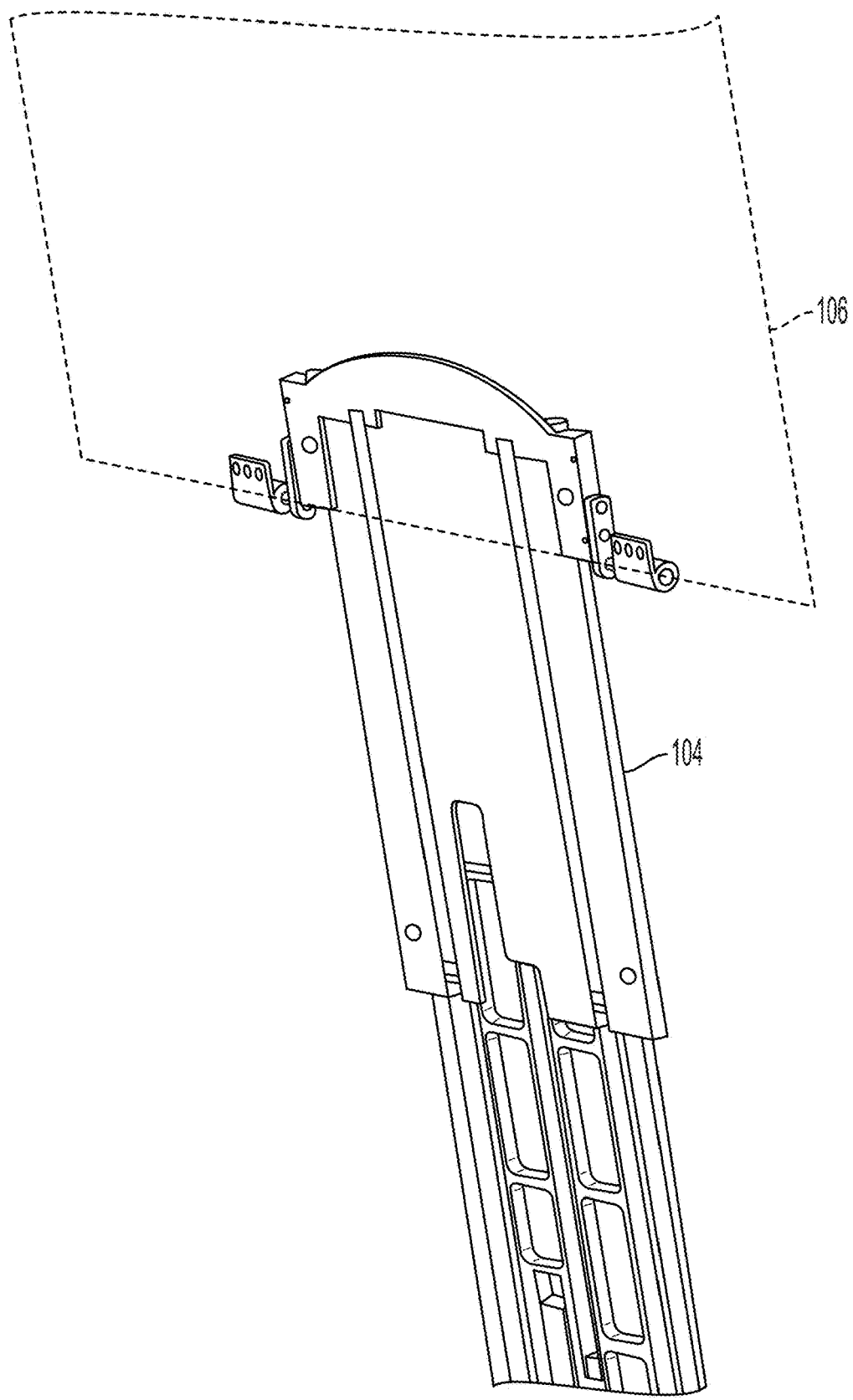
FIG. 2B schematically illustrates a first type of support member in an automatic computer display system, according to one or more embodiments shown and described herein.

Turning now to FIG. 2B, a support member 104 in an automatic computer display system 100 is depicted, through which embodiments of the disclosure can be implemented. In this embodiment, the display device 106 is secured to the support member 104, and more specifically to the upper telescoping support member 122, by way of fasteners, although any suitable type of attachment may be utilized. Friction, for example, may be utilized between the upper telescoping support member 122, the lower telescoping support member 124, and/or the display device 106 to hold the display device 106 in place. The friction may be overcome by generating sufficient force of movement to overcome the friction and thereby move the display device 106. In this embodiment, a portion of the upper telescoping support member 122 provides backing support for display device 106. In other embodiments, the upper telescoping support member 122 may provide no backing support or full backing support up to the top of the display device 106.

Figure 2C:
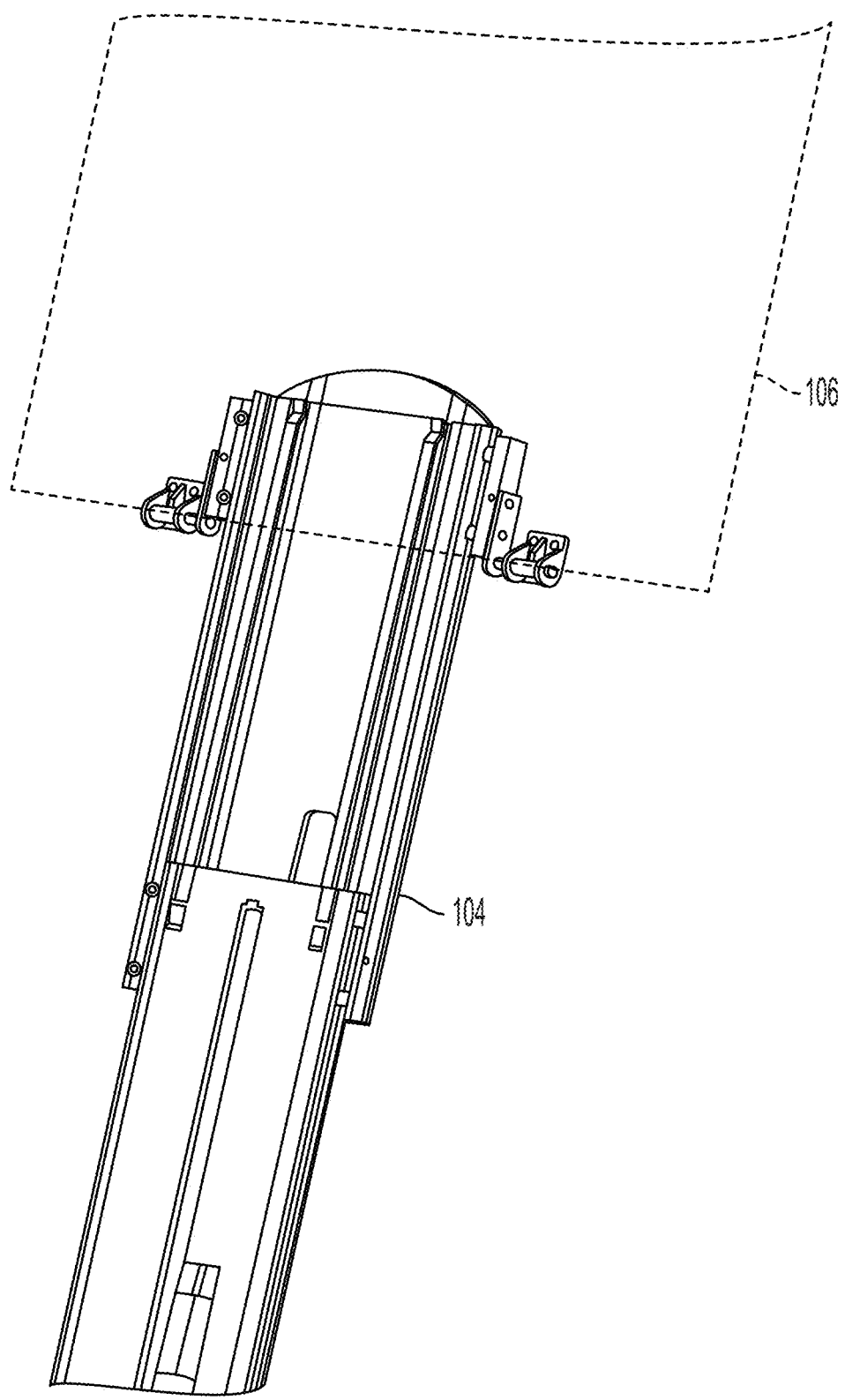
FIG. 2C schematically illustrates a second type of support member in an automatic computer display system, according to one or more embodiments shown and described herein.

Turning now to FIG. 2C, another type of support member 104 in an automatic computer display system 100 is depicted, through which embodiments of the disclosure can be implemented. FIG. 2C depicts a reversed view from FIG. 2B. In this embodiment, the upper telescoping support member 122 and the lower telescoping support member 124 have corresponding groove channels that interlock to guide the vertical telescopic movement. Any suitable configuration of groove channels may be utilized in various embodiments. In some embodiments, groove channels are not be utilized, such that the upper telescoping support member 122 fits within the lower telescoping support member 124 or vice versa.

Figure 3A:
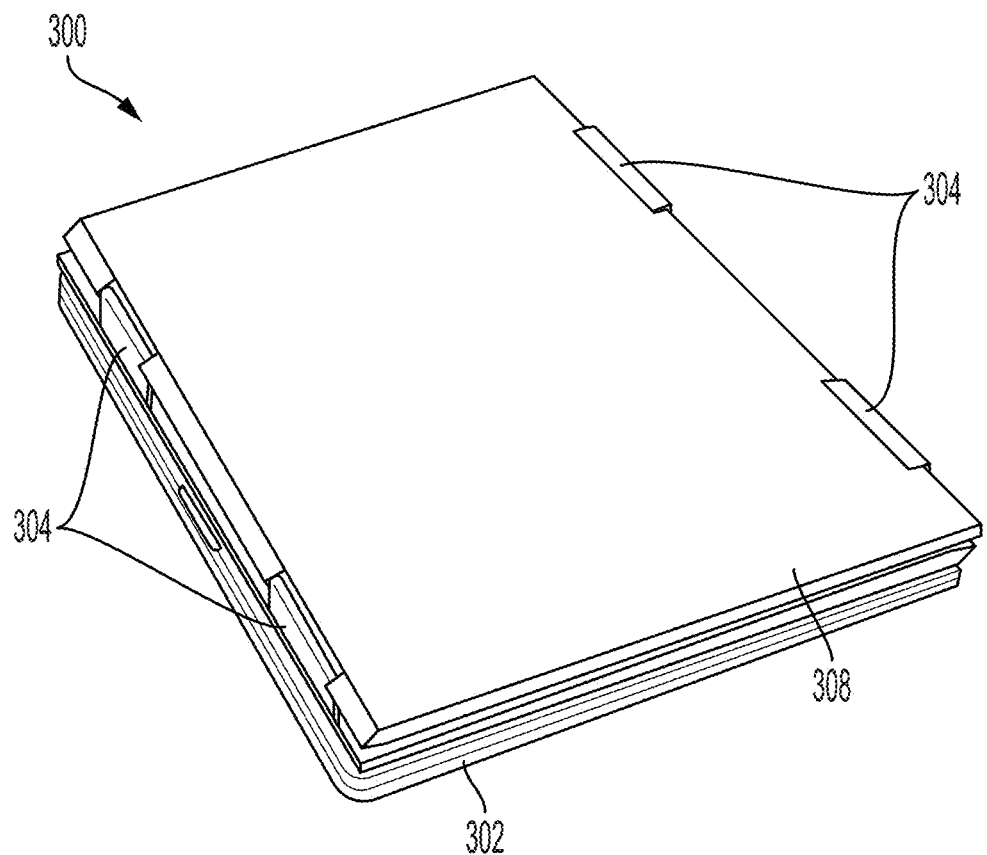
FIG. 3A schematically illustrates a dual screen computer display system in a closed position, according to one or more embodiments shown and described herein.

Turning now to FIG. 3A, a dual screen computer display system 300 in a closed position is depicted, through which embodiments of the disclosure can be implemented. In this embodiment, the first display device 306 faces the base member 302 by lying flat upon the base member 302. The second display device 308, lying flat upon first display device 306, faces a same direction as the first display device 306. In other embodiments, any number of display devices may be utilized and/or may face any direction.

Figure 3B:
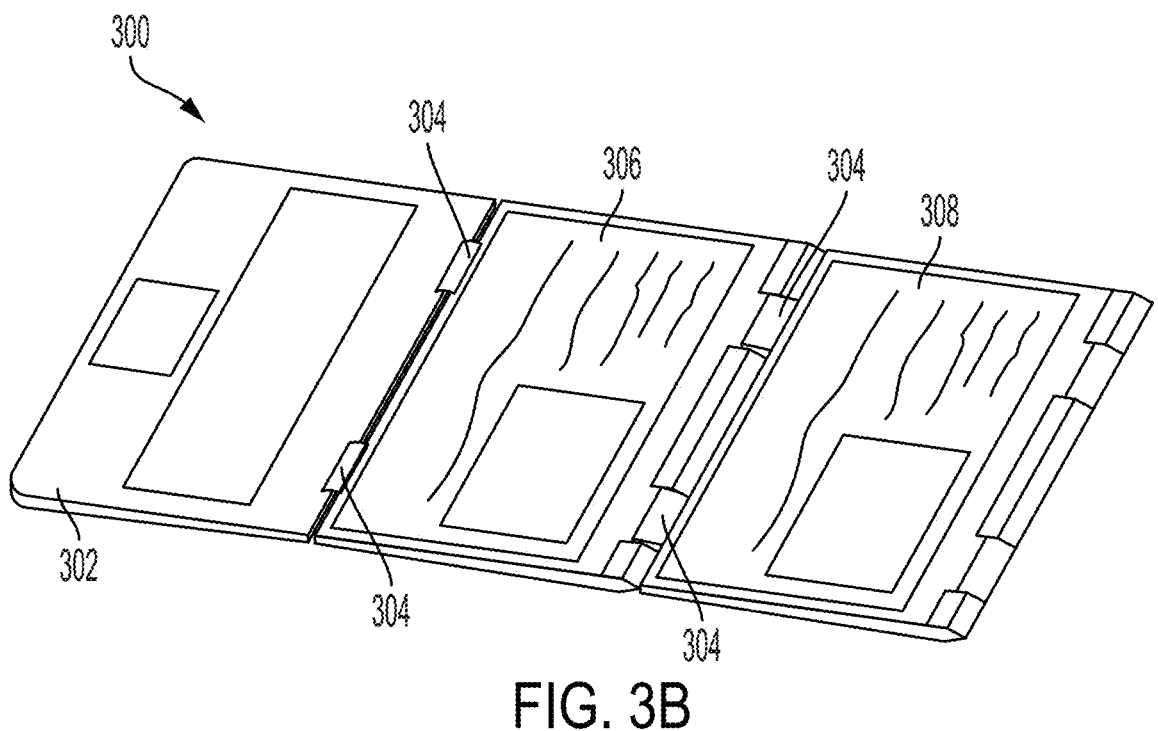
FIG. 3B schematically illustrates a dual screen computer display system in a flat open position, according to one or more embodiments shown and described herein.

Turning now to FIG. 3B, the dual screen computer display system 300 lying in a flat open position is depicted, through which embodiments of the disclosure can be implemented. In this embodiment, the dual screen computer display system 300 has been unfolded by a user such the base member 302, first display device 306, and second display device 308 are all lying flat on a surface. Connectors 304, which in this embodiment are hinged, attach the first display device 306 and the second display device 308 and/or attach the first display device 306 and the base member 302. In other embodiments, any suitable type of connector may be utilized to connect the base member 302, first display device 306, and second display device 308 at any suitable portion, not being limited to edges.

Figure 3C:
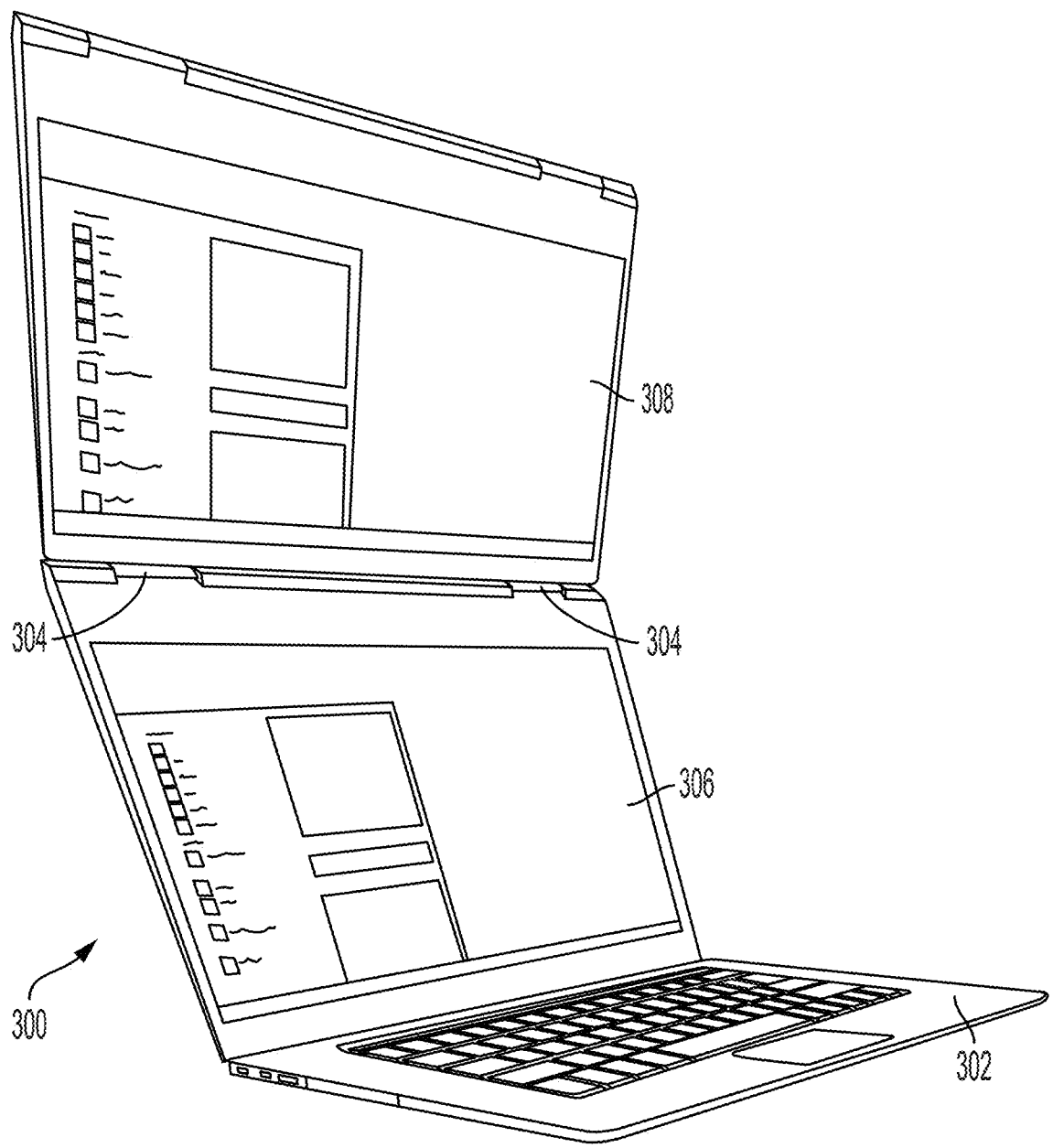
FIG. 3C schematically illustrates a dual screen computer display system in a vertical position, according to one or more embodiments shown and described herein.

Turning now to FIG. 3C, a dual screen computer display 300 system in a vertical position, through which embodiments of the disclosure can be implemented. In this embodiment the connectors 304 have rigidity sufficient to allow the first display device 306 and second display device 308 to remain in place based on how the screens are position by a user, such as in the vertical positions depicted, although other embodiments may be configured differently. In this embodiment, both screens face the user, although other orientations may be utilized in other embodiments.

Figure 3D:
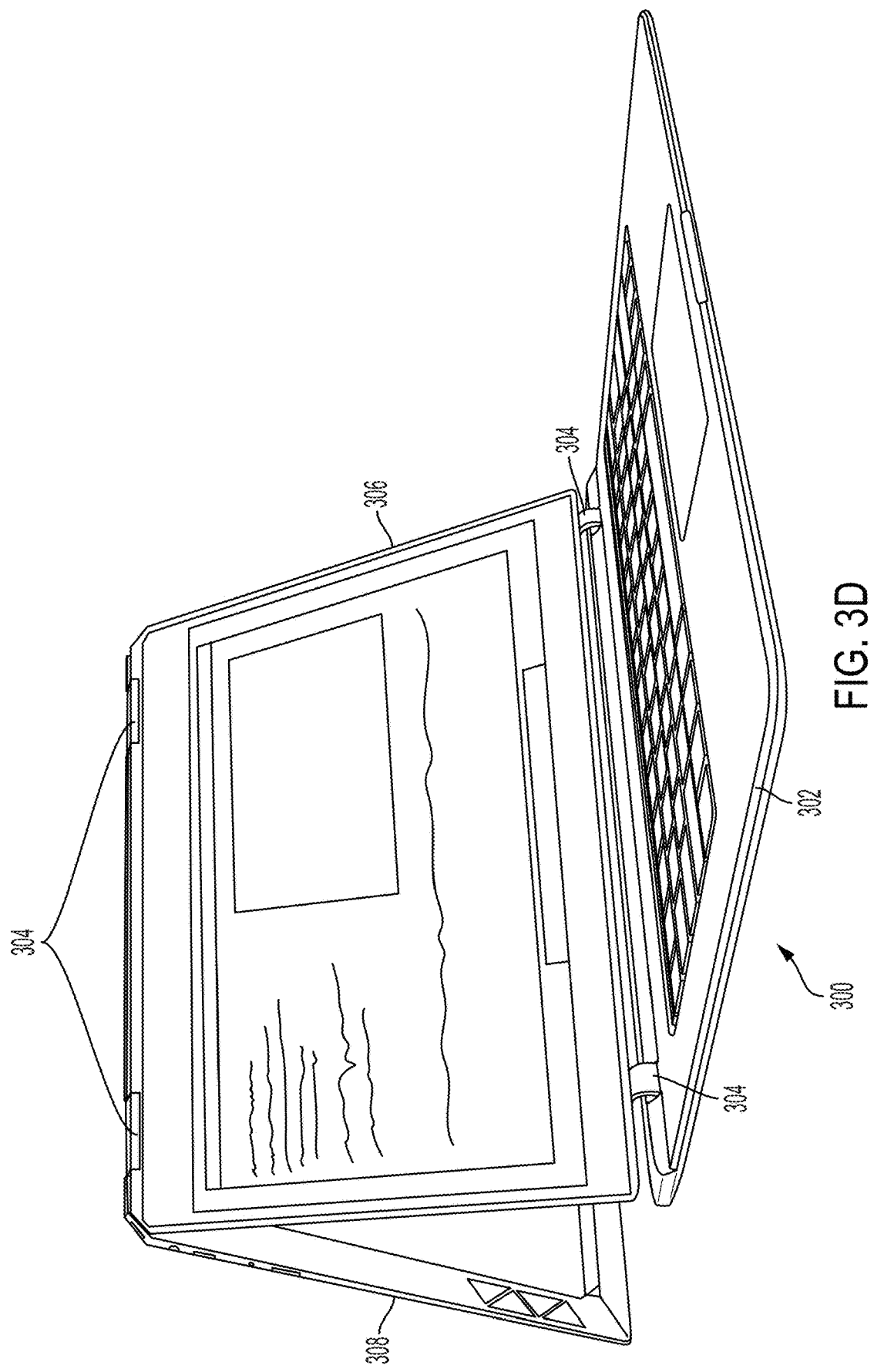
FIG. 3D schematically illustrates a dual screen computer display system in a presentation position, according to one or more embodiments shown and described herein.

Turning now to FIG. 3D, a dual screen computer display system 300 in a presentation position is depicted, through which embodiments of the disclosure can be implemented. In this embodiment, the first display device 306 faces a user while the second display device 308 faces away from the user. In this embodiment, this allows the user to present the second screen to others (such as an audience for a presentation), while maintaining a view of the same material on the first display device 306 facing the user. The first display device 306 and the second display device 308 may or may not display the same output, which may also change at any time.

Figure 4B:
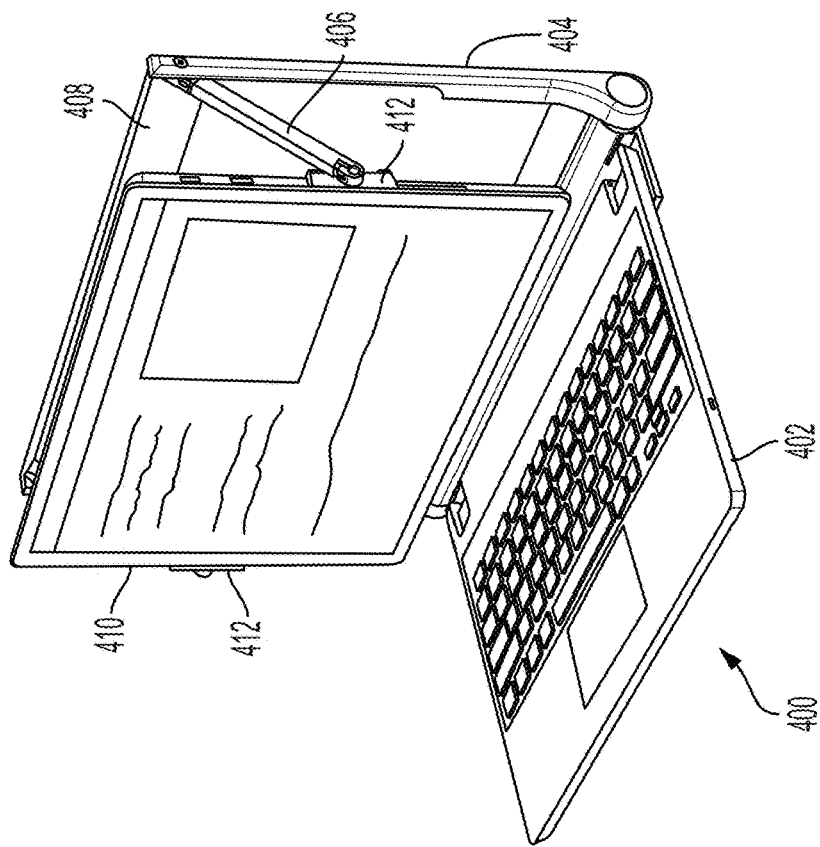
FIG. 4B schematically illustrates a manual lift computer display system with arms in a lowered position, according to one or more embodiments shown and described herein.
Figure 4A:
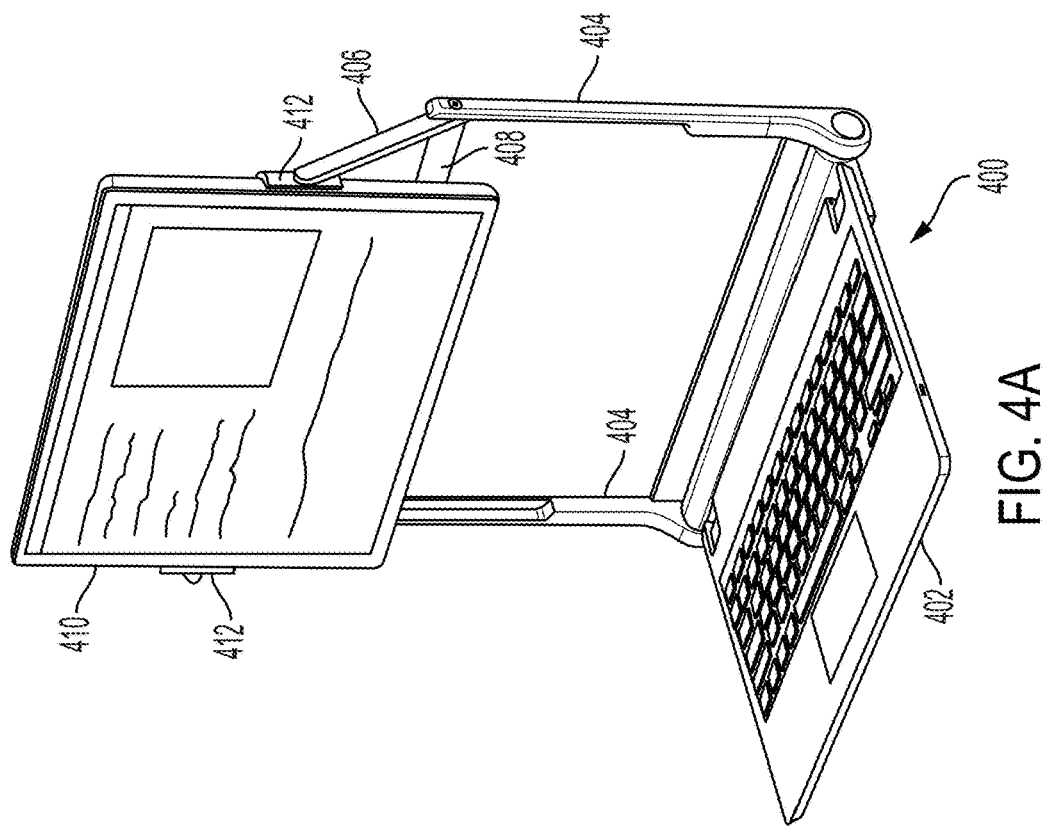
FIG. 4A schematically illustrates a manual lift computer display system with arms in a raised position, according to one or more embodiments shown and described herein.

Turning now to FIG. 4A, a manual lift computer display system 400 with a base member 402 and a first set of arms 404 in a raised position is depicted, through which embodiments of the disclosure can be implemented. In this embodiment, the first set of arms 404 are connected to the base member 402 via base hinges 403, although any suitable configuration may be used in other embodiments. The base hinges 403 allow the first set of arms 404 to pivot with respect to the back end of the base member 402. The base hinges 403 and the first set of arms 404 both have the strength such to support the first set of arms 404 in a raised position while supporting other components, such as the second set of arms 406 and the display device 410. The first set of arms 404 connect the first terminus of each of the second set of arms 406 via intermediate hinges 405. As used herein, the term "terminus" encompasses not only an end portion but any part between the end and midpoint of an object, although any suitable configuration may be used in other embodiments. The intermediate hinges 405 allow the first set of arms 404 to pivot with respect to the back end of the base member 402. The intermediate hinges 405 and the second set of arms 406 both have the strength such to support the second set of arms 406 in a raised position while supporting other components, such as the display device 410.

Grippers 412 at the terminus of each of the second set of arms 406 attach to the display device 410 via top hinges 407, where the gripper may be any suitable type of fastener. Different types of grippers 412 may be used on different arms within the second set of arms 406 and may connect to any suitable portions of the display device 410 and/or respective arms within the second set of arms 406. The top hinges 407 allow the terminus of each of the second set of arms 406 to pivot with respect to the grippers 412 attached to the display device 4, although any suitable configuration may be used in other embodiments. The top hinges 407 have the strength such to support the display device 410 in a variety of positions with respect to the grippers 412 and the second set of arms 406.

The display device 410 may be extended by any suitable means, such as telescoping/retractable arm(s), thin retractable wire, worm screws sliding, accordion folding, folding/unfolding, flexible plastic tubing, positional coolant hose, flexible tubing (lamp neck), feral with adjustable resisting via friction, positional tubing, segmented spindle, binding, deployable handle, handle raise (protruding or nesting under ball tab ring), affordance to hand to grab and pull, and the like. A connecting member 408 may connect at least two of the first set of arms 404 with each other and/or at least two of the second set of arms 406 with each other. The base member 402, the first set of arms 404, and the display device 410 may form a moveable frame along into which the display device may be stowed as depicted in FIG. 4C.

Turning now to FIG. 4B, a manual lift computer display system 400 with the first set of arms 404 in a lowered position is depicted, through which embodiments of the disclosure can be implemented. Continuing with this embodiment, a user has lowered the display device 410.

Figure 4D:
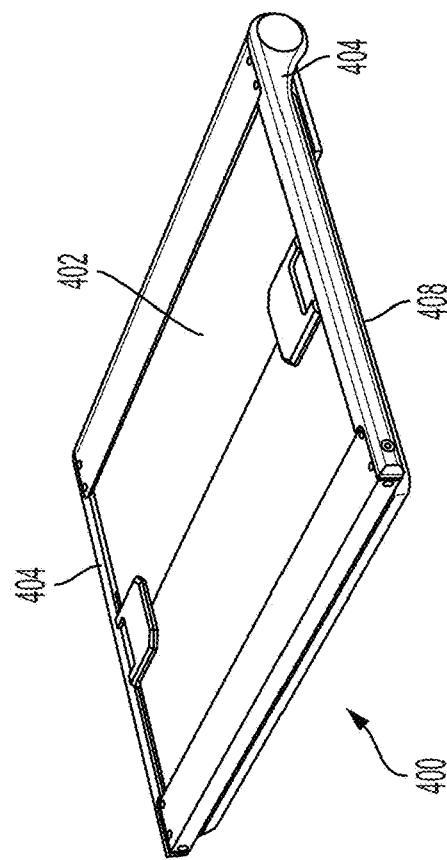
FIG. 4D schematically illustrates a manual lift computer display system in a closed position, according to one or more embodiments shown and described herein.
Figure 4C:
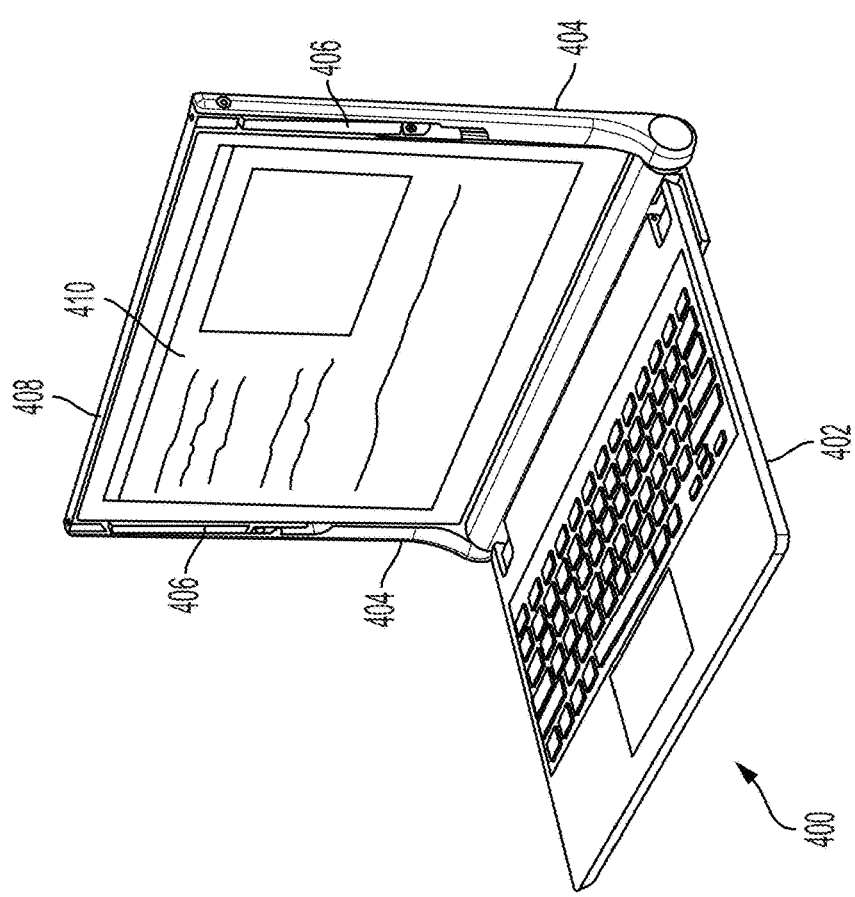
FIG. 4C schematically illustrates a manual lift computer display system with arms stowed, according to one or more embodiments shown and described herein.

Turning now to FIG. 4C, a manual lift computer display system 400 with arms stowed is depicted, through which embodiments of the disclosure can be implemented. Continuing with this embodiment, a user has further lowered the display device 410 such that the second set of arms 406 are stowed with the first set of arms 404 and the manual lift computer display system 400 resembles a laptop.

Turning now to FIG. 4D, a manual lift computer display system 400 in a closed position is depicted, through which embodiments of the disclosure can be implemented. Continuing with this embodiment, a user has closed the manual lift computer display system 400 such that the display device 410, along with the first set of arms 404 and the second set of arms 406, has been collapsed onto the base member 402.

Figure 5A:
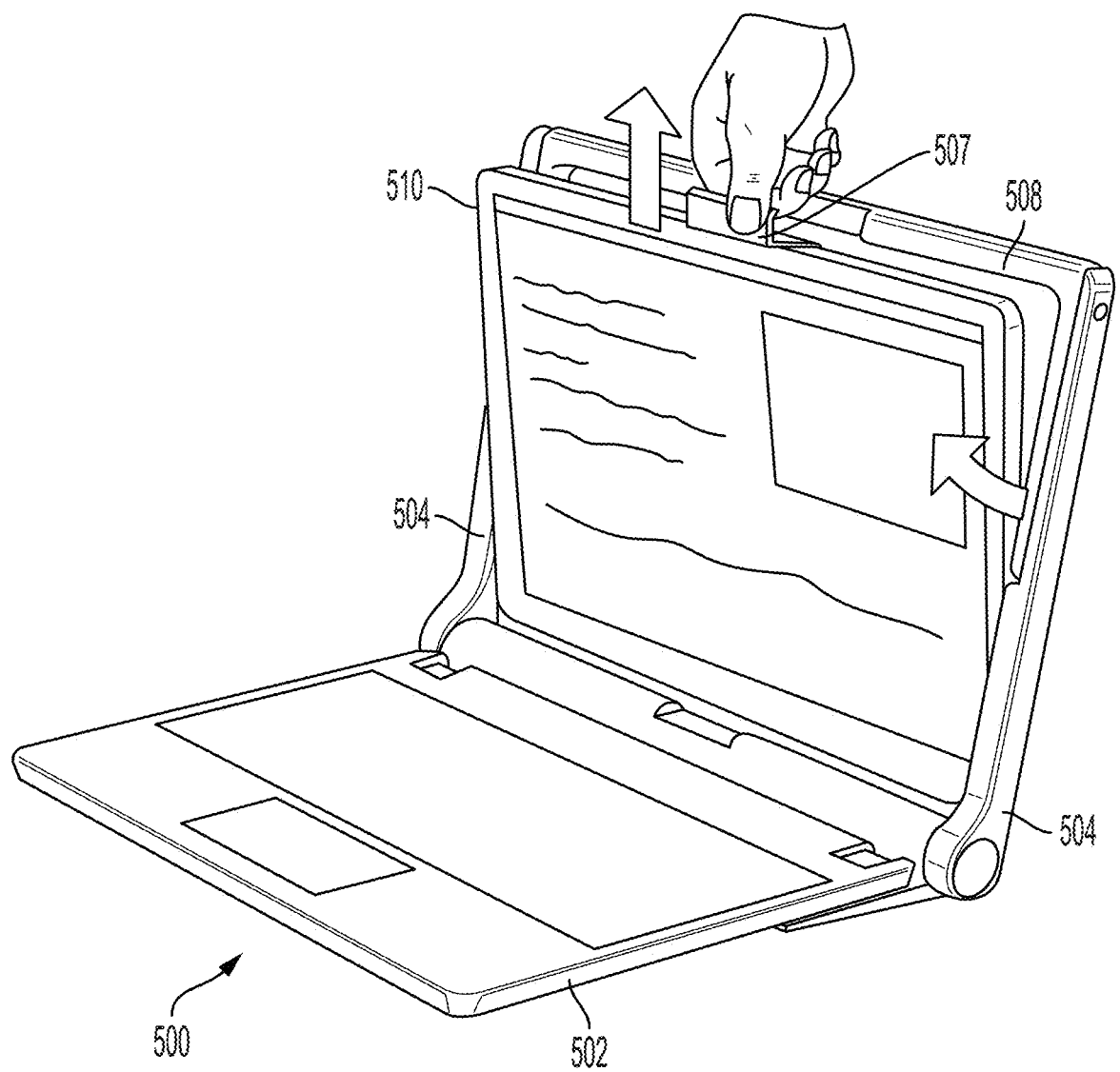
FIG. 5A schematically illustrates a frontal view of a manual lift tab computer display system in a lowered position, according to one or more embodiments shown and described herein.

Turning now to FIG. 5A, a frontal view of a manual lift tab computer display system 500 in a lowered position is depicted, through which embodiments of the disclosure can be implemented. The display device 510 may be locked into a position and/or unlock from a position utilizing a tab 507, a latch, a button, or a knob, where the computer display system further comprises the tab 507, latch, button, or knob. In this embodiment, a user pulls on the tab 507 to remove the display device 510 from the connecting member 508. In some embodiments, the terms "frame" and "connecting member" may be used interchangeably. The tab 507 as shown is located at the top of the display device 510 and protrudes upward from the screen of the display device 510 so that the display device 510 can be pulled forward and/or upward from its collapsed position within the first set of arms 504 and the second set of arms 506 and adjoining the base member 502.

Figure 5B:
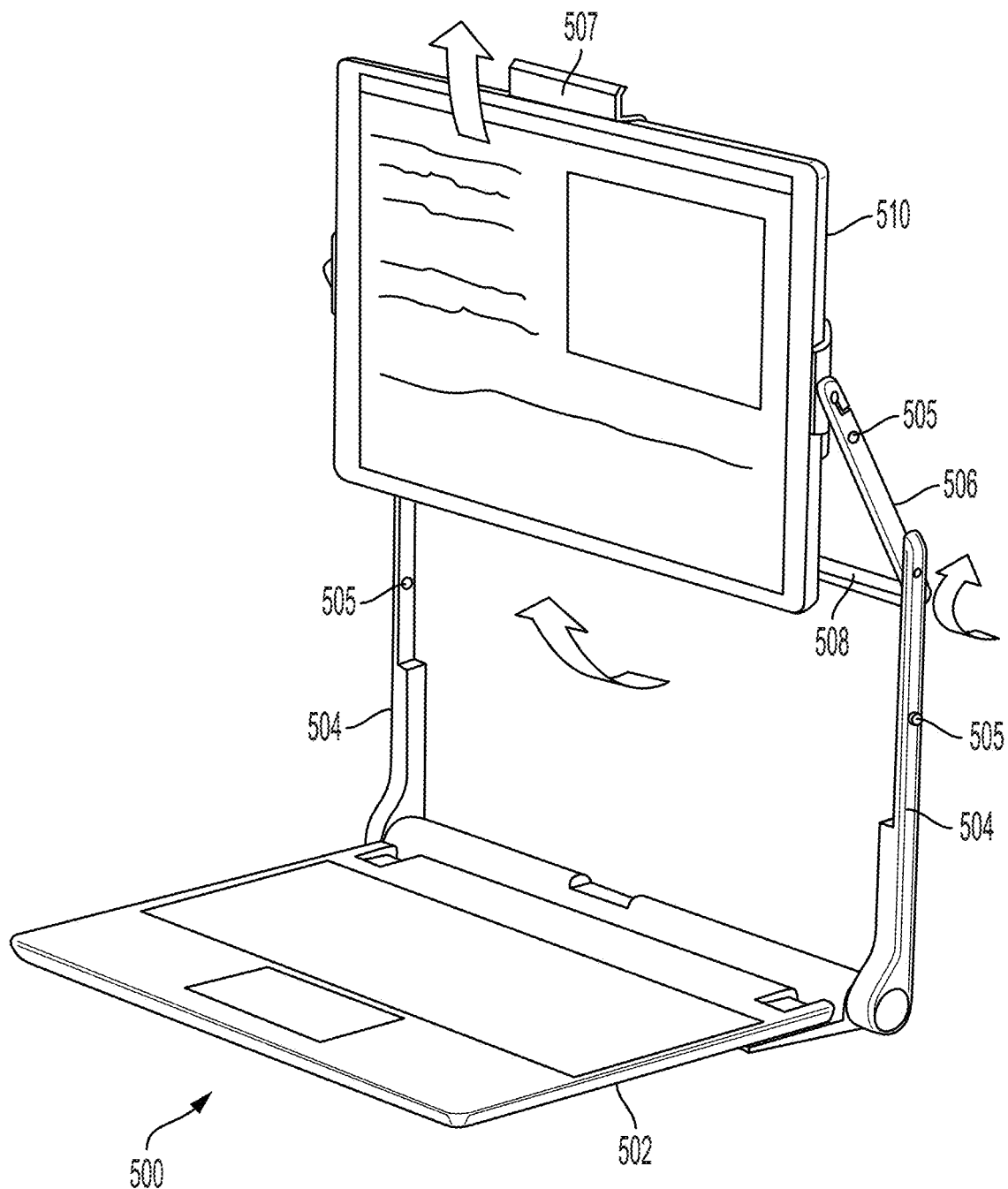
FIG. 5B schematically illustrates a frontal view of a manual lift tab computer display system in a raised position, according to one or more embodiments shown and described herein.

Turning now to FIG. 5B, a frontal view of a manual lift tab computer display system 500 in a raised position is depicted, through which embodiments of the disclosure can be implemented. In this embodiment, the display device 510 is lifted by its tab 507 to a raised position. In this embodiment, magnets 505 are located on the first set of arms 504 and the connecting member 508 to secure the display device 510 in the lowered position. Any number and/or position of magnets 505 may be utilized in any suitable configuration, and some embodiments may not utilize any magnets. Magnets 505 may be located on or below surfaces of any suitable components of the manual lift tab computer display system 500. Any embodiments described herein may utilize one or more magnets 505.

Figure 5C:
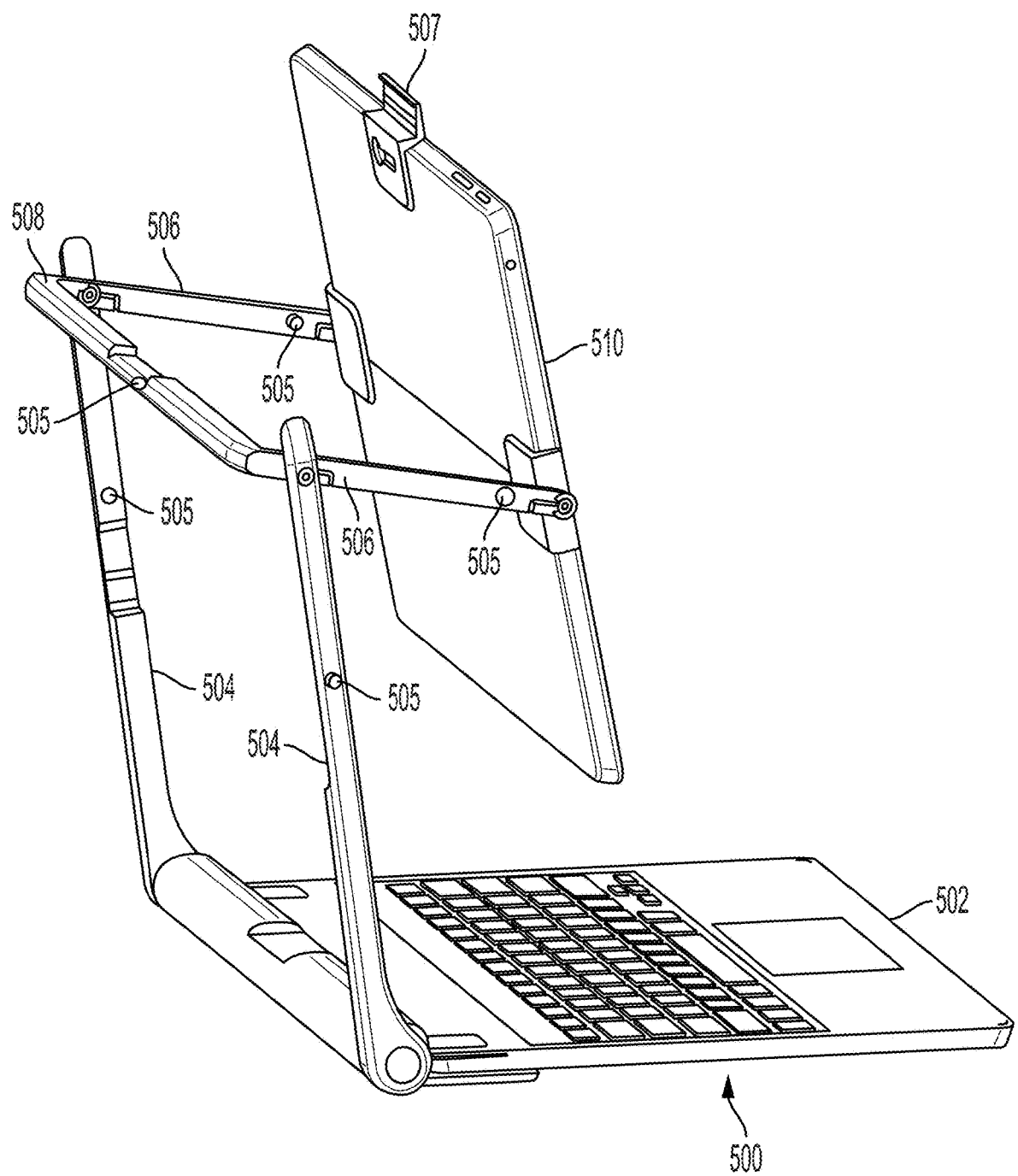
FIG. 5C schematically illustrates a side view of a manual lift tab computer display system in a raised position, according to one or more embodiments shown and described herein.

Turning now to FIG. 5C, a side view of a manual lift tab computer display system 500 in a raised position is depicted, through which embodiments of the disclosure can be implemented. In another embodiment, side tabs may be utilized in addition to or in place of the tab 507 depicted herein. Side tabs may but need not have the same size, shape, and/or be made of the same material. The display device 510 may be lifted by side tabs to a raised position and lowered to place the display device 510 back to a lowered position, such as within a closed position within the first set of arms 504 and the second set of arms 506. The side tabs may protrude outward away from the screen of the display device 510 so that the display device 510 can be pulled forward and/or upward.

Figure 5D:
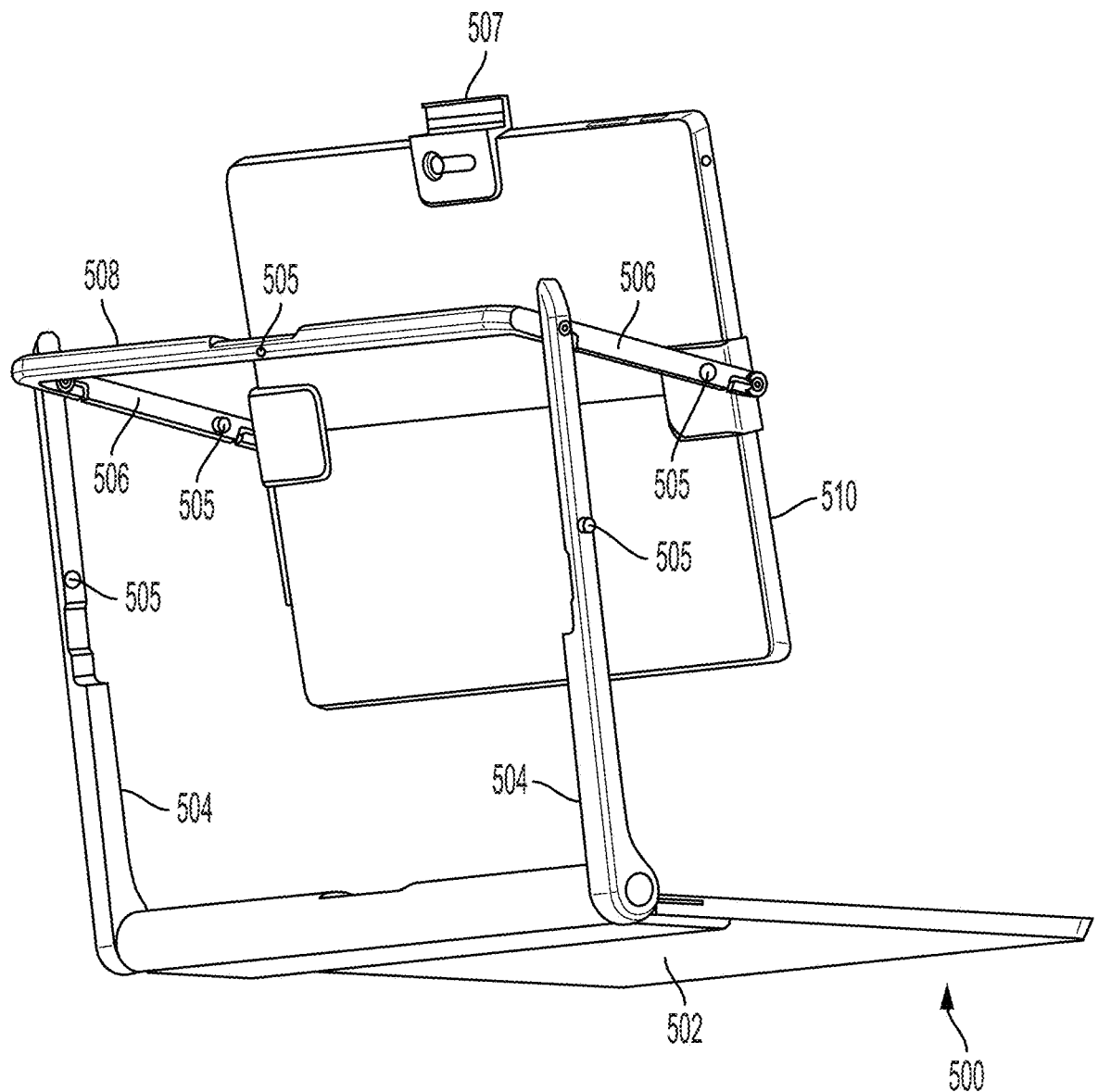
FIG. 5D schematically illustrates a rear view of a manual lift tab computer display system in a raised position, according to one or more embodiments shown and described herein.

Turning now to FIG. 5D, a rear view of a manual lift tab computer display system 500 in a raised position is depicted, through which embodiments of the disclosure can be implemented.

Figure 6A:
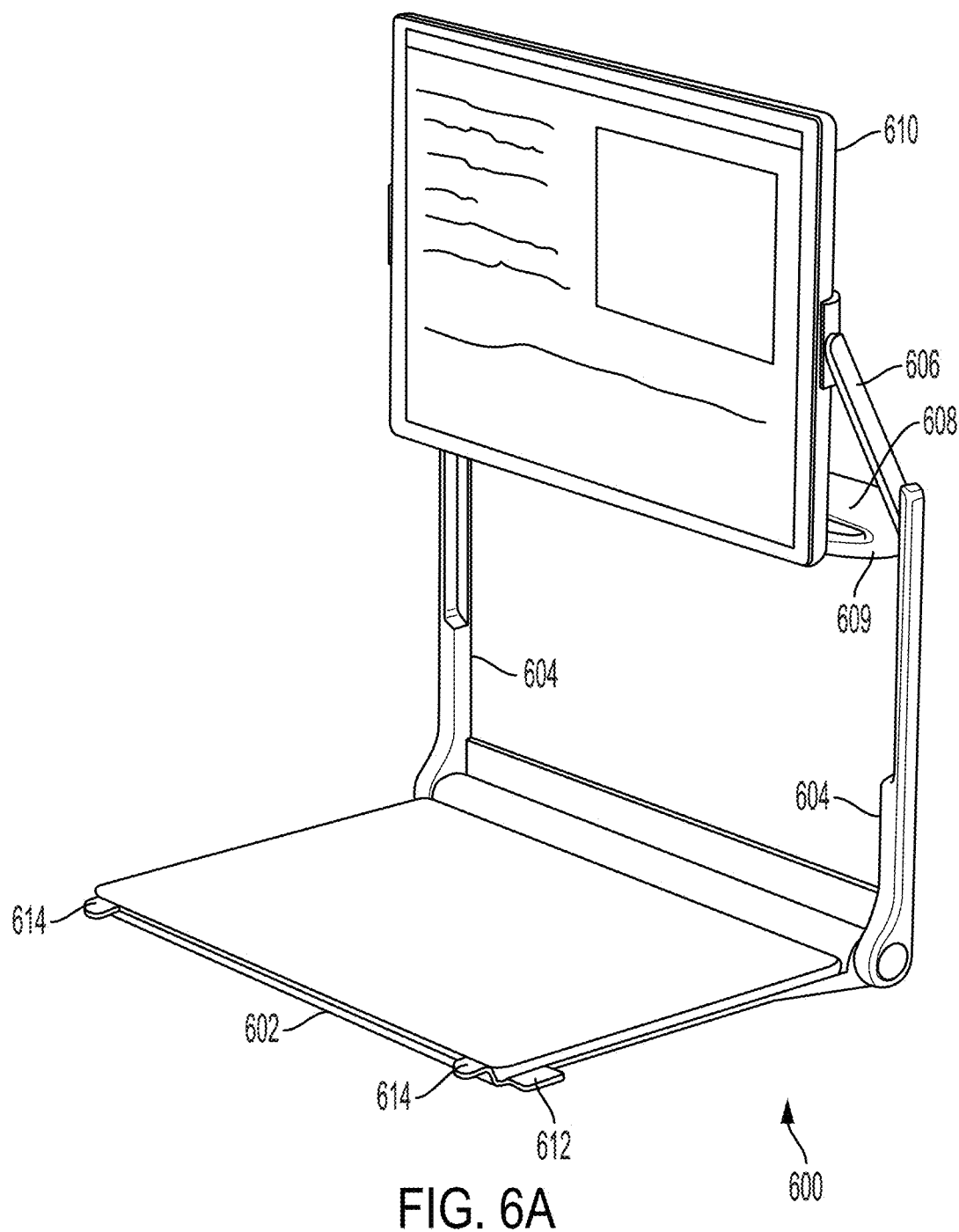
FIG. 6A schematically illustrates a handled manual computer display system with arms in a raised position, according to one or more embodiments shown and described herein.

Turning now to FIG. 6A, a handled manual computer display system 600 with a second set of arms 606 in a raised position is depicted, through which embodiments of the disclosure can be implemented. In this embodiment, a curved handle 609 may form part of the connecting member 608 or be attached or otherwise affixed to the connecting member 608. Any suitable type of handle may be utilized in other embodiments, whether curved or otherwise. In some embodiments, the curved handle may be part of other components the handled manual computer display system 600, such as the base member 602, a first set of arms 604, the second set of arms 606, the display device 610, and the like. In this embodiment, magnetic locks 614 help maintain a closed position where the base member 602 and the display device 610 are joined together. A finger tab 612 may be utilized when the handled manual computer display system 600 is in a closed position to assist a user with separating the base member 602 and the display device 610. Any suitable number of finger tabs 612 and/or magnetic locks 614, including none of either, may be utilized in any suitable configuration(s) and/or position(s).

Figure 6B:
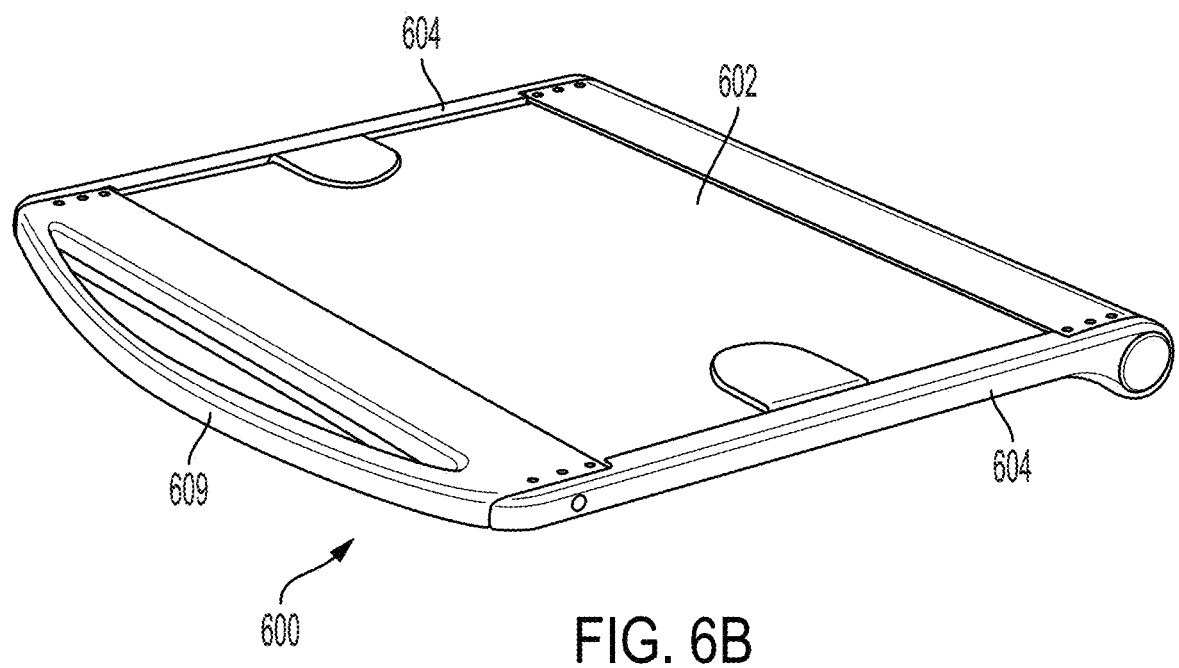
FIG. 6B schematically illustrates a handled manual computer display system in a closed position, according to one or more embodiments shown and described herein.

Turning now to FIG. 6B, a handled manual computer display system 600 in a closed position is depicted, through which embodiments of the disclosure can be implemented.

Figure 7B:
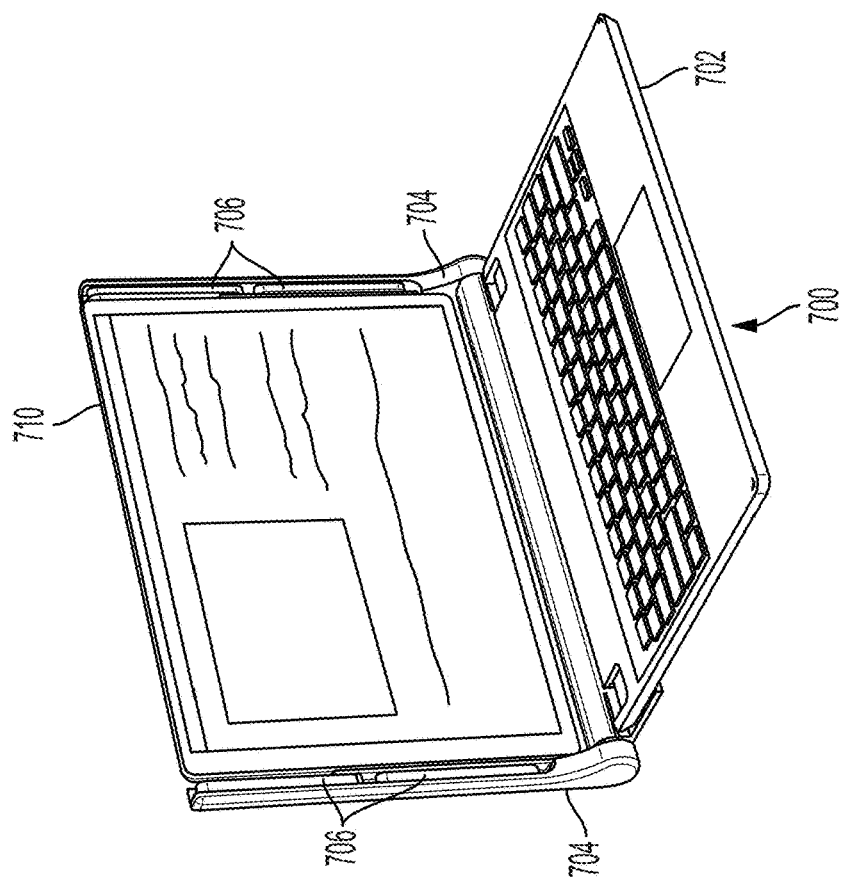
FIG. 7B schematically illustrates a manual lift computer display system with four stowed arms, according to one or more embodiments shown and described herein.
Figure 7A:
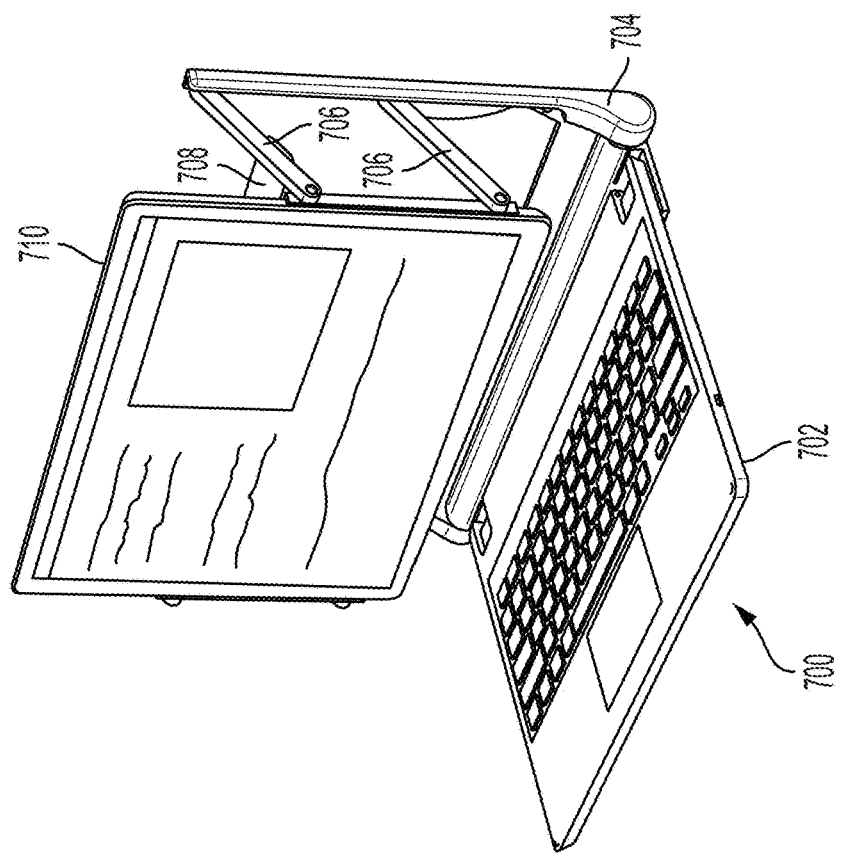
FIG. 7A schematically illustrates a manual lift computer display system with four arms in a lowered position, according to one or more embodiments shown and described herein.

Turning now to FIG. 7A, a four arm manual lift computer display system 700 in a lowered position is depicted, through which embodiments of the disclosure can be implemented. In this embodiment, there are four arms in a second set of arms 706. In other embodiments any suitable number of arms may be utilized in the first set of arms 704 and/or the second set of arms 706.

Turning now to FIG. 7B, a four arm manual lift computer display system 700 with four stowed arms is depicted, through which embodiments of the disclosure can be implemented. The first set of arms 704, the second set of arms 706, a connecting member 708, and a base member 702, are configured to form a frame around the display device 710 when the display device 710 lays upon the base member 702.

Figure 8:
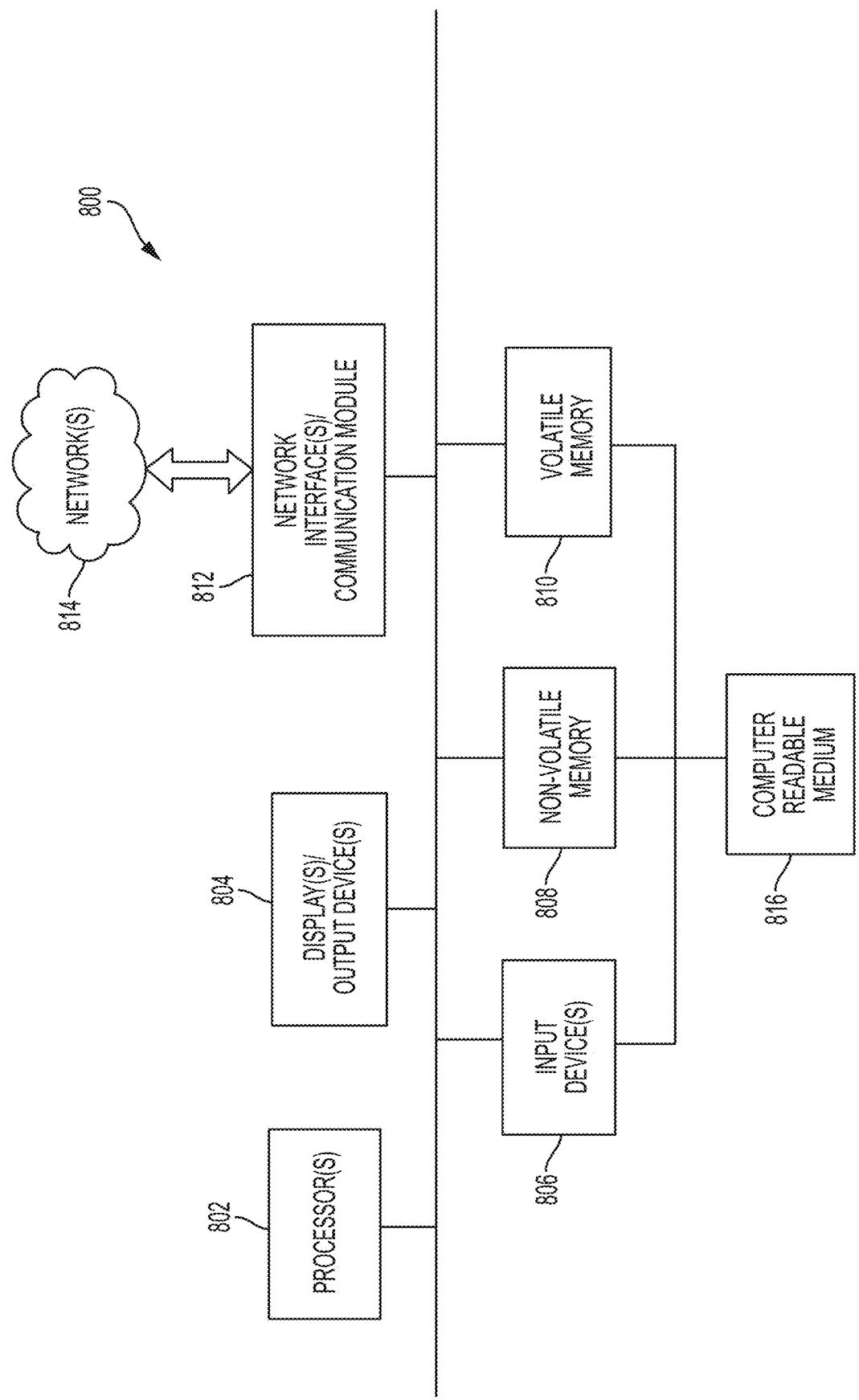
FIG. 8 is a block diagram illustrating computing hardware utilized in one or more computer display systems, according one or more embodiments shown and described herein.

Turning now to FIG. 8, a block diagram illustrates an exemplary computing device 800, through which embodiments of the disclosure can be implemented. The computing device 800 described herein is but one example of a suitable computing device and does not suggest any limitation on the scope of any embodiments presented. The computing device 800 in some embodiments may also be utilized to implement a computer display system. Nothing illustrated or described with respect to the computing device 800 should be interpreted as being required or as creating any type of dependency with respect to any element or plurality of elements. In various embodiments, a computing device 800 may include, but need not be limited to, a desktop, laptop, server, client, tablet, smartphone, or any other type of device that can compress data. In an embodiment, the computing device 800 includes at least one processor 802 and memory (non-volatile memory 808 and/or volatile memory 810). The computing device 800 can include one or more displays and/or output devices 804 such as monitors, speakers, headphones, projectors, wearable-displays, holographic displays, and/or printers, any of which may be manually and/or automatically repositionable, for example.

The computing device 800 may further include one or more input devices 806 which can include, by way of example, any type of button, flip switch, rocker switch, potentiometer, joystick, trackpad, pointing stick, nub, mouse, keyboard, disk/media drive, memory stick/thumb-drive, memory card, pen, touch-input device, biometric scanner, voice/auditory input device, motion-detector, camera, scale, and the like. Input devices 806 may further include sensors, such as biometric (blood pressure, pulse, heart rate, perspiration, temperature, voice, facial-recognition, iris or other types of eye recognition, hand geometry, fingerprint, DNA, dental records, weight, or any other suitable type of biometric data, etc.), video/still images, motion data (accelerometer, GPS, magnetometer, gyroscope, etc.) and audio (including ultrasonic sound waves). Input devices 806 may further include cameras (with or without audio recording), such as digital and/or analog cameras, still cameras, video cameras, thermal imaging cameras, infrared cameras, cameras with a charge-couple display, night-vision cameras, three-dimensional cameras, webcams, audio recorders, and the like.

The computing device 800 may include non-volatile memory 808 (ROM, flash memory, etc.), volatile memory 810 (RAM, etc.), or a combination thereof. A network interface 812 can facilitate communications over a network 814 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 812 can be communicatively coupled to any device capable of transmitting and/or receiving data via the network 814. Accordingly, the network interface hardware 812 can include a communication transceiver for sending and/or receiving any wired or wireless communication. For example, the network interface hardware 812 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 816 may comprise a plurality of computer readable mediums, each of which may be either a computer readable storage medium or a computer readable signal medium. A computer readable storage medium 816 may reside, for example, within an input device 806, non-volatile memory 808, volatile memory 810, or any combination thereof. A computer readable storage medium can include tangible media that is able to store instructions associated with, or used by, a device or system. A computer readable storage medium includes, by way of example: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 800 may include one or more network interfaces 812 to facilitate communication with one or more remote devices, which may include, for example, client and/or server devices. A network interface 812 may also be described as a communications module, as these terms may be used interchangeably.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A computer display system comprising:
    a base member configured to provide stability and comprising an input device;
    a support member attached to a first terminus of the base member, the support member comprising an actuator configured to change support member length based upon an input received at the input device; and
    a display device attached at a second terminus of the support member opposite the first terminus;
    wherein the support member is further configured to change support member length based upon an input received wirelessly, wherein the input specifies a range of movement or a predefined position with respect to the display device.

2. The computer display system of claim 1 wherein the display device comprises a liquid crystal display, a light-emitting diode display, a cathode ray tube display, a plasma display, a digital light processing display, an organic light-emitting diode display, an electronic paper display, or an electroluminescent display.

3. The computer display system of claim 1 wherein the input device comprises a button, a flip switch, a rocker switch, a potentiometer, a joystick, a trackpad, a pointing stick, or a nub.

4. The computer display system of claim 1 wherein the support member is further configured to move the display device lengthwise, widthwise, heightwise, or any combination thereof.

5. The computer display system of claim 1 wherein the actuator comprises a linear actuator, a precision actuator, a stepper motor, a direct current motor, a rodless actuator, a pneumatic actuator, an electromagnetic rail actuator, a rack and pinion actuator, a pulley actuator, a micro-positioning linear actuator, a nano-positioning linear actuator, or a segmented spindle actuator.

6. The computer display system of claim 1 wherein the display device is configured to: tilt horizontally;
    tilt vertically; or
    tilt in three dimensions based on being attached to spherical rolling joint.

* * * * *